US012628080B2

(12) United States Patent
Chu et al.

(10) Patent No.: US 12,628,080 B2
(45) Date of Patent: May 12, 2026

(54) WIRELESS DEVICE POWER MANAGEMENT

(71) Applicant: NXP USA, Inc., Austin, TX (US)

(72) Inventors: Liwen Chu, San Ramon, CA (US); Kiseon Ryu, McLean, VA (US); Hongyuan Zhang, Fremont, CA (US)

(73) Assignee: NXP USA, Inc., Austin, TX (US)

( * ) Notice: Subject to any disclaimer, the term of this patent is extended or adjusted under 35 U.S.C. 154(b) by 306 days.

(21) Appl. No.: 18/447,173

(22) Filed: Aug. 9, 2023

(65) Prior Publication Data

US 2024/0056974 A1      Feb. 15, 2024

Related U.S. Application Data

(60) Provisional application No. 63/371,219, filed on Aug. 11, 2022, provisional application No. 63/371,047, filed on Aug. 10, 2022, provisional application No. 63/371,049, filed on Aug. 10, 2022.

(51) Int. Cl.
*H04W 52/02* (2009.01)
*H04W 84/12* (2009.01)

(52) U.S. Cl.
CPC ... *H04W 52/0229* (2013.01); *H04W 52/0212* (2013.01); *H04W 84/12* (2013.01)

(58) Field of Classification Search
CPC ......... H04W 52/0229; H04W 52/0212; H04W 84/12; H04W 76/15; H04W 52/0216
See application file for complete search history.

(56) References Cited

U.S. PATENT DOCUMENTS

| | | | |
|---|---|---|---|
| 10,716,066 B2 | 7/2020 | Huang et al. | |
| 2016/0219522 A1* | 7/2016 | Asterjadhi | ........ H04W 52/0235 |
| 2019/0246354 A1 | 8/2019 | Huang et al. | |
| 2019/0253967 A1 | 8/2019 | Xiao et al. | |
| 2022/0264429 A1* | 8/2022 | Gan | .................... H04W 52/028 |
| 2023/0073868 A1 | 3/2023 | Nayak et al. | |
| 2023/0262768 A1 | 8/2023 | Ko et al. | |
| 2023/0319711 A1 | 10/2023 | Uppala et al. | |
| 2024/0334468 A1 | 10/2024 | Shinohara et al. | |
| 2025/0175958 A1 | 5/2025 | Cao et al. | |

FOREIGN PATENT DOCUMENTS

| | | |
|---|---|---|
| CN | 111194063 A | 5/2020 |
| CN | 113541896 A | 10/2021 |

OTHER PUBLICATIONS

U.S. Appl. No. 18/099,906, filed Jan. 20, 2023; 31 pages.
IEEE, "IEEE P802.11ax™/D6.0, Draft Standard for Information technology—Telecommunications and information exchange between systems Local and metropolitan area networks", IEEE P802.11 ax™/D6.0, Nov. 2019, 780 pgs.

(Continued)

*Primary Examiner* — Mohammad S Anwar

(57) ABSTRACT

A method of managing power in a first wireless device associated with an additional wireless device includes receiving power management information for a first link of the first wireless device via any of a plurality of links of the first wireless device. Power consumption of the first link of the first wireless device is then managed, based on the power management information that was received from any of the links.

22 Claims, 30 Drawing Sheets

| awake 156 | doze 158 | awake 156 |
|---|---|---|

AP 1

| awake 156 | doze 158 | awake 156 |
|---|---|---|

AP 2

| PPDU addressed to AP 2 194 |
|---|

STA 1

| PPDU addressed to AP 1 196 |
|---|

STA 2

- The PHY header indicates that the received PPDU is a DL PPDU.

- The BSS Color in the received PPDU is not the BSS color announced by the AP.

- The RA of the received frame is not its BSSID.

- The Address 3 of the received Management frame with broadcast RA is not its BSSID.

(56)        References Cited

OTHER PUBLICATIONS

"IEEE Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications," in IEEE Std 802.11-2020 (Revision of IEEE Std 802.11-2016); vol. No. 1-4379, Feb. 26, 2021, doi: 10.1109/IEEESTD. 2021.9363693. 11.2.6 SM power save; 84 pgs.

"IEEE Draft Standard for Information technology—Telecommunications and information exchange between systems Local and metropolitan area networks—Specific requirements Part 11: Wireless LAN Medium Access Control (MAC) and Physical Layer (PHY) Specifications Amendment 1: Enhancements for High Efficiency WLAN," in IEEE P802.11ax/D8.0, Oct. 2020 (approved draft) , vol. No. pp. 1-820, Nov. 3, 2020. 26.14.1 Intra-PPDU power save for non-AP HE STAs; 6 pages.

U.S. Appl. No. 18/099,906; Non-Final Office Action; Mailed on Jun. 11, 2025; 46 pages.

U.S. Appl. No. 18/099,906 (Notice of Allowance mailed on Nov. 18, 2025; 13 pages.

* cited by examiner

200

TXOP 182

AP receives

AP sends

RTS — SIFS — CTS — SIFS — DATA — SIFS — ACK — PIFS — RTS — SIFS — CTS — SIFS — DATA — SIFS — ACK

AP turns on more than one RF chain for remaining TXOP if STA supports >1 SS spatial stream Failed frame exchange within TXOP detected.

shared RF processing 162

RF chain 164
RF chain 166
RF chain 168
RF chain 170 switch array 172

174 176 178 180

Use of Active Mode Power save

AP 1

AP 2

STA 1

STA 2 awake 156 doze 158 awake 156 doze 158 awake 156 awake 156

PPDU addressed to AP 2 194

PPDU addressed to AP 1 196

- The PHY header indicates that the received PPDU is a DL PPDU.

- The BSS Color in the received PPDU is not the BSS color announced by the AP.

- The RA of the received frame is not its BSSID.

- The Address 3 of the received Management frame with broadcast RA is not its BSSID.

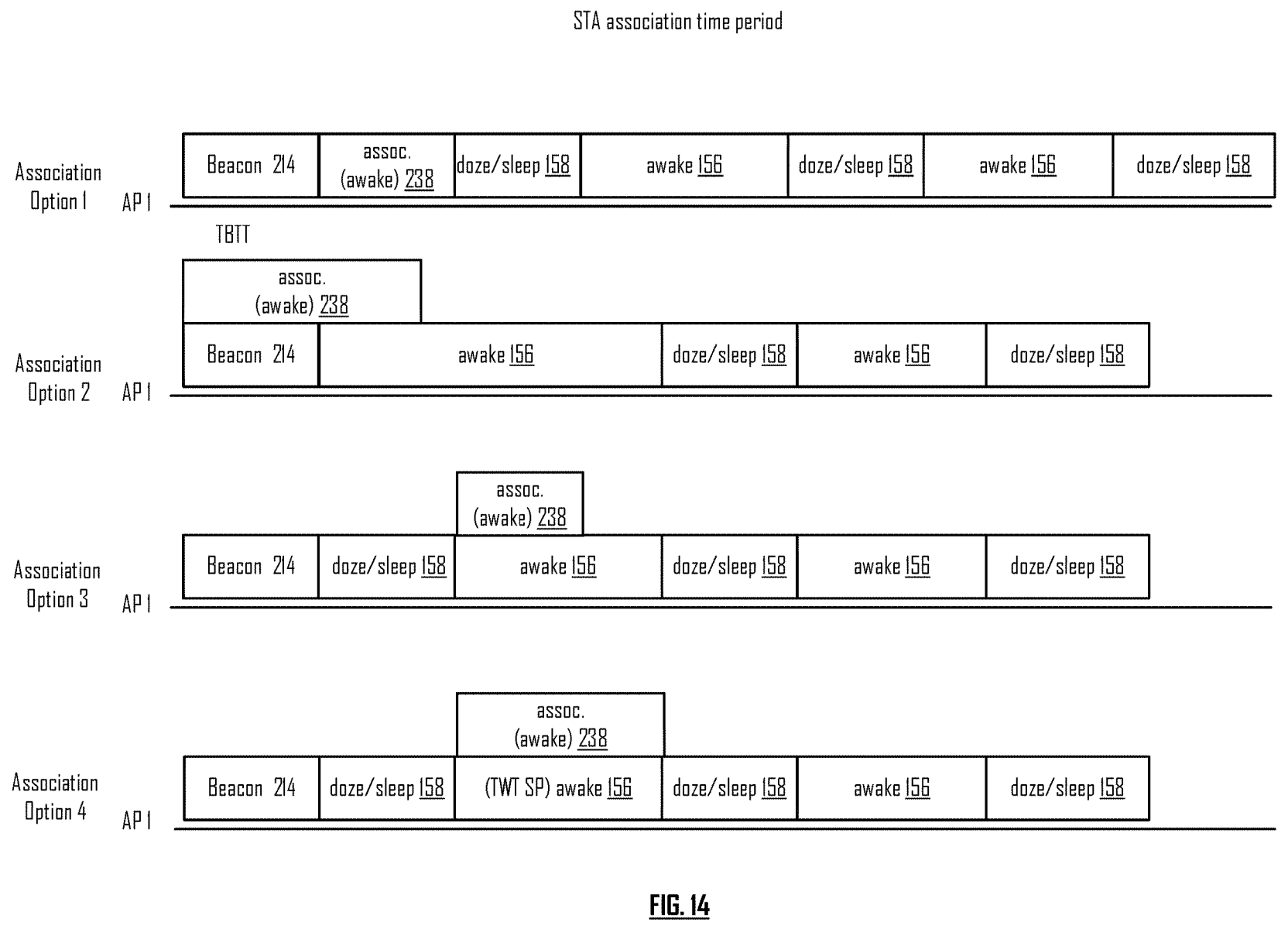

STA association time period

Association Option 1

AP 1 | Beacon 214 | assoc. (awake) 238 | doze/sleep 158 | awake 156 | doze/sleep 158 | awake 156 | doze/sleep 158

TBTT

Association Option 2 assoc. (awake) 238

AP 1 | Beacon 214 | awake 156 | doze/sleep 158 | awake 156 | doze/sleep 158

Association Option 3 assoc. (awake) 238

AP 1 | Beacon 214 | doze/sleep 158 | awake 156 | doze/sleep 158 | awake 156 | doze/sleep 158

Association Option 4 assoc. (awake) 238

AP 1 | Beacon 214 | doze/sleep 158 | (TWT SP) awake 156 | doze/sleep 158 | awake 156 | doze/sleep 158

FIG. 14

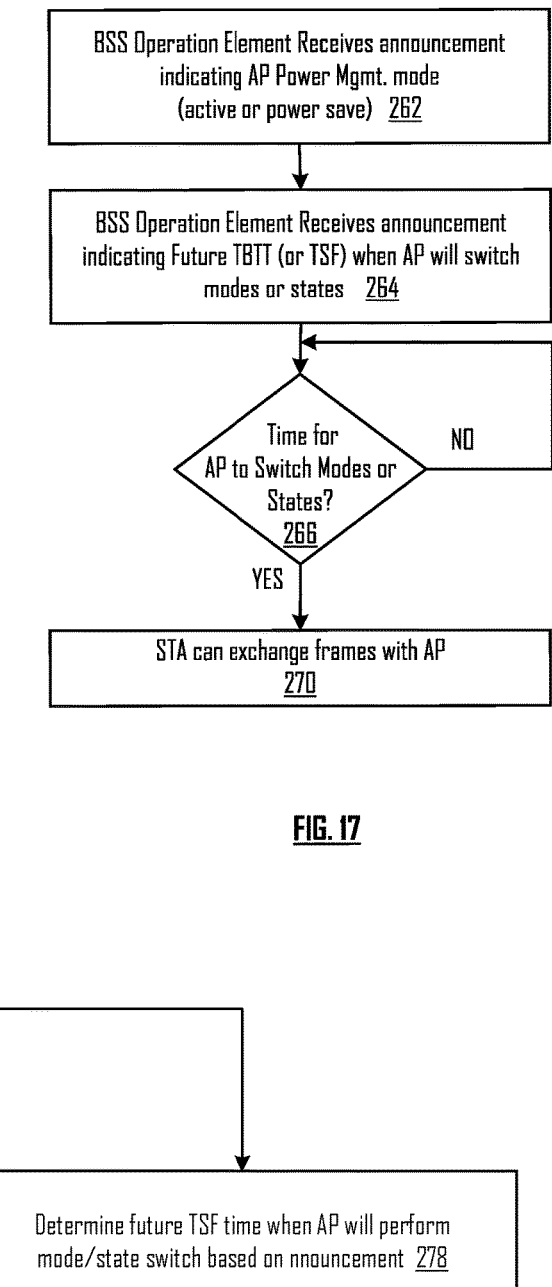

BSS Operation Element Receives announcement indicating AP Power Mgmt. mode (active or power save) 262

BSS Operation Element Receives announcement indicating Future TBTT (or TSF) when AP will switch modes or states 264

Time for AP to Switch Modes or States? 266

NO

YES

STA can exchange frames with AP 270

FIG. 17

Receive announcement (unicast frame or broadcast frame) from AP indicating future time when AP will perform mode/state switch 272

Announcement include info. Indicating number of BIs? 274

NO

YES

Determine number of remaining beacon intervals until future time when AP will perform mode/state switch based on announcement 276

Determine future TSF time when AP will perform mode/state switch based on nnouncement 278

FIG. 18

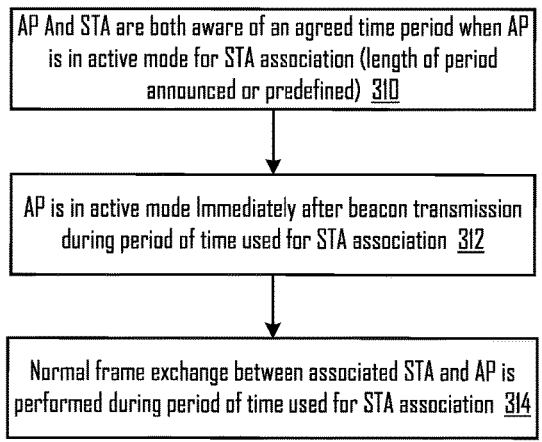

AP And STA are both aware of an agreed time period when AP is in active mode for STA association (length of period announced or predefined) 310

AP is in active mode Immediately after beacon transmission during period of time used for STA association 312

Normal frame exchange between associated STA and AP is performed during period of time used for STA association 314

FIG. 22A

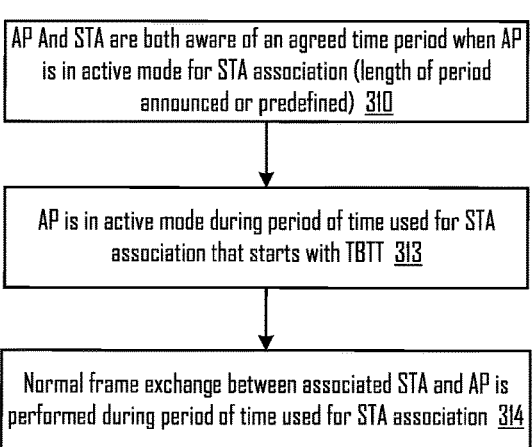

AP And STA are both aware of an agreed time period when AP is in active mode for STA association (length of period announced or predefined) 310

AP is in active mode during period of time used for STA association that starts with TBTT 313

Normal frame exchange between associated STA and AP is performed during period of time used for STA association 314

FIG. 22C

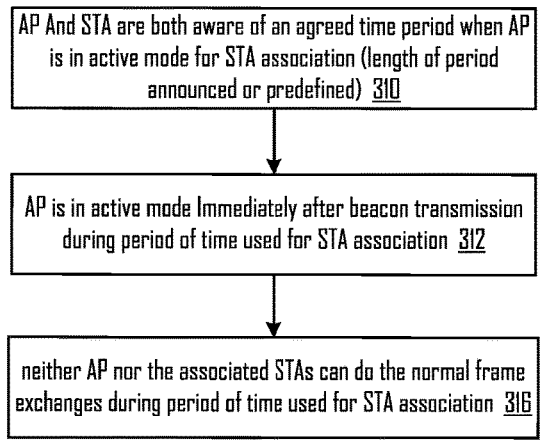

AP And STA are both aware of an agreed time period when AP is in active mode for STA association (length of period announced or predefined) 310

AP is in active mode Immediately after beacon transmission during period of time used for STA association 312 neither AP nor the associated STAs can do the normal frame exchanges during period of time used for STA association 316

FIG. 22B

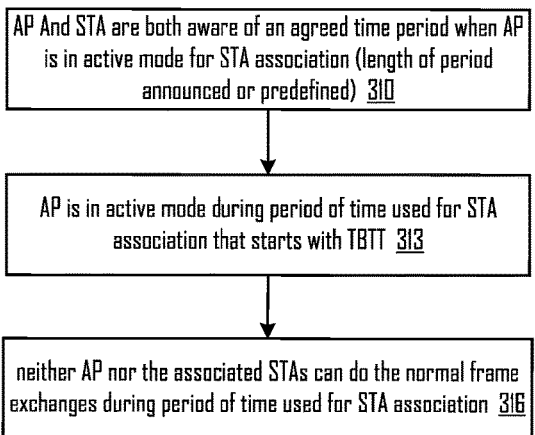

AP And STA are both aware of an agreed time period when AP is in active mode for STA association (length of period announced or predefined) 310

AP is in active mode during period of time used for STA association that starts with TBTT 313 neither AP nor the associated STAs can do the normal frame exchanges during period of time used for STA association 316

FIG. 22D

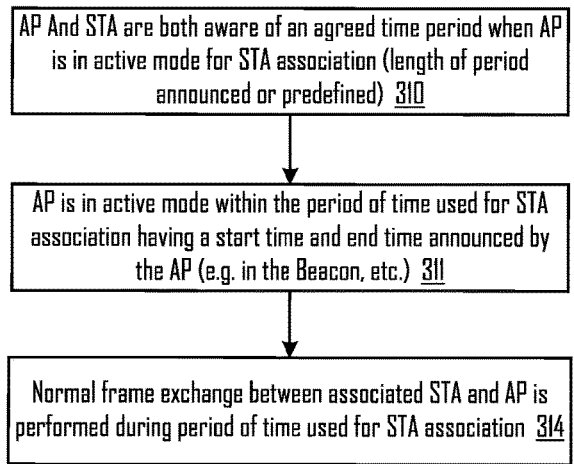

AP And STA are both aware of an agreed time period when AP is in active mode for STA association (length of period announced or predefined) 310

AP is in active mode within the period of time used for STA association having a start time and end time announced by the AP (e.g. in the Beacon, etc.) 311

Normal frame exchange between associated STA and AP is performed during period of time used for STA association 314

FIG. 22E

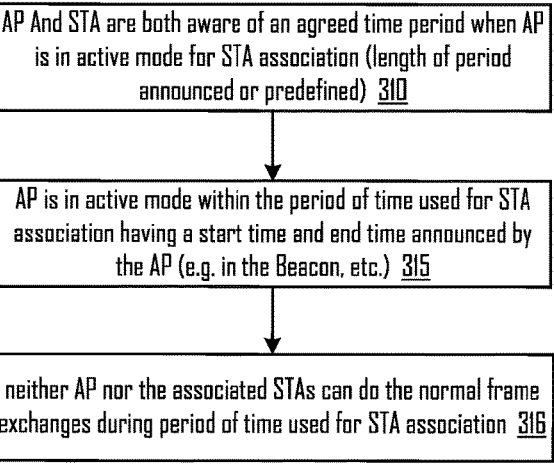

AP And STA are both aware of an agreed time period when AP is in active mode for STA association (length of period announced or predefined) 310

AP is in active mode within the period of time used for STA association having a start time and end time announced by the AP (e.g. in the Beacon, etc.) 315 neither AP nor the associated STAs can do the normal frame exchanges during period of time used for STA association 316

FIG. 22F

APs of AP MLD Announce Modes <u>402</u>

STA transmits request specifying APs/links to wake <u>404</u>

AP Chooses link(s) to wake (based purely on MLD request or using TID to link mapping) <u>406</u>

AP announces links being changed to wake state <u>408</u>

STA exchanges frames with AP via link awakened <u>410</u>

AP MLD associated with first AP in PS mode 420

STA requests first AP to wake using link to different AP 422

AP MLD accepts request? 424

NO

AP remains in PS mode 428

YES

AP wakes 426

Each AP of an AP MLD announces its mode independently 412

All APs in links mapped to TID of STA in PS Mode? 414

NO

Transmit frames of TID to AP via at least one awake AP 418

YES

STA buffers UL frames 416

Co-Located APs affiliated with different AP MLDs share RF Chain2 491-2 and RF Chain3 491-3

RNR Carries AP mode Switch time, Full Critical Update of AP1 Carried in Beacon of AP2

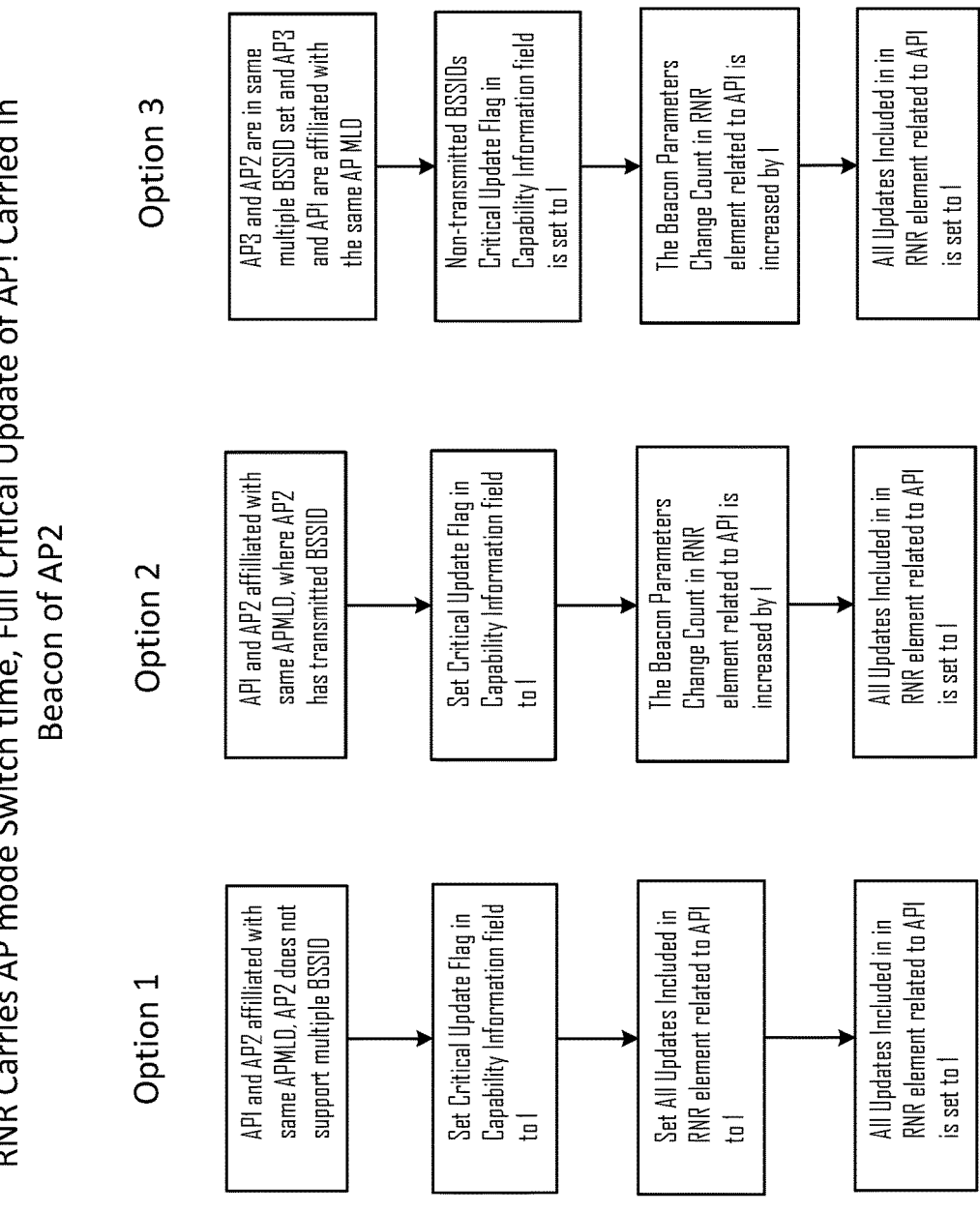

Option 1

AP1 and AP2 affilliated with same APMLD. AP2 does not support multiple BSSID

↓

Set Critical Update Flag in Capability Information field to 1

↓

Set All Updates Included in RNR element related to AP1 to 1

↓

All Updates Included in in RNR element related to AP1 is set to 1

Option 2

AP1 and AP2 affilliated with same APMLD, where AP2 has transmitted BSSID

↓

Set Critical Update Flag in Capability Information field to 1

↓

The Beacon Parameters Change Count in RNR element related to AP1 is increased by 1

↓

All Updates Included in in RNR element related to AP1 is set to 1

Option 3

AP3 and AP2 are in same multiple BSSID set and AP3 and AP1 are affiliated with the same AP MLD

↓

Non-transmitted BSSIDs Critical Update Flag in Capability Information field is set to 1

↓

The Beacon Parameters Change Count in RNR element related to AP1 is increased by 1

↓

All Updates Included in in RNR element related to AP1 is set to 1

FIG. 34

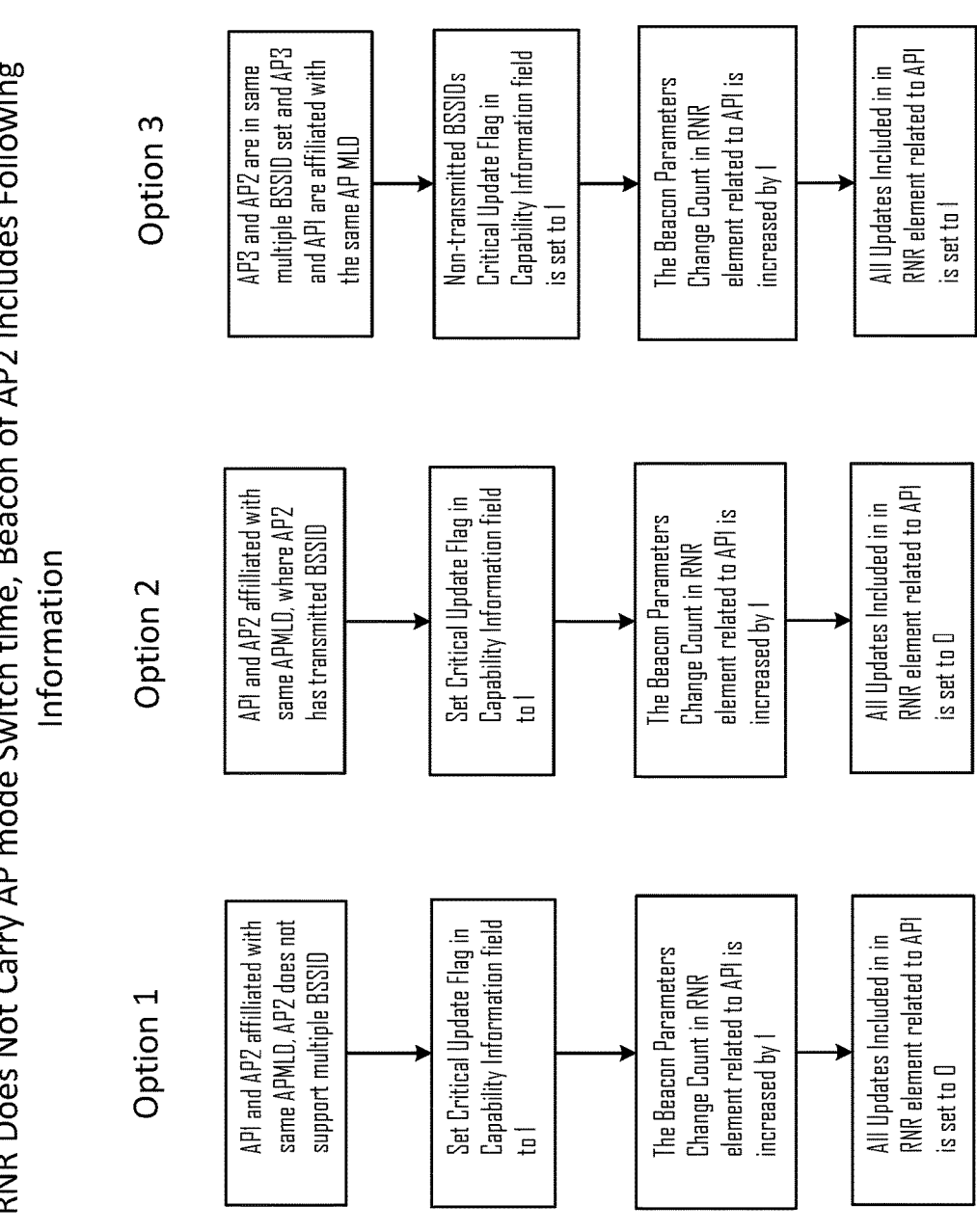

RNR Does Not Carry AP mode Switch time, Beacon of AP2 Includes Following Information Option 1

API and AP2 affilliated with same APMLD. AP2 does not support multiple BSSID

Set Critical Update Flag in Capability Information field to 1

The Beacon Parameters Change Count in RNR element related to API is increased by 1

All Updates Included in in RNR element related to API is set to 0

Option 2

API and AP2 affilliated with same APMLD, where AP2 has transmitted BSSID

Set Critical Update Flag in Capability Information field to 1

The Beacon Parameters Change Count in RNR element related to API is increased by 1

All Updates Included in in RNR element related to API is set to 0

Option 3

AP3 and AP2 are in same multiple BSSID set and AP3 and API are affiliated with the same AP MLD Non-transmitted BSSIDs Critical Update Flag in Capability Information field is set to 1

The Beacon Parameters Change Count in RNR element related to API is increased by 1

All Updates Included in in RNR element related to API is set to 1

FIG. 35

WIRELESS DEVICE POWER MANAGEMENT

CROSS-REFERENCE TO RELATED APPLICATIONS

The present U.S. Utility patent application claims priority pursuant to 35 U.S.C. § 119(e) to the following U.S. Provisional applications: U.S. Provisional Application No. 63/371,047, entitled "Intra-PPDU Power Save, Dynamic SM Power Save", filed Aug. 10, 2022; U.S. Provisional Application No. 63/371,049, entitled "AP Power Save Under TWT AP Power Save without TWT", filed Aug. 10, 2022; and U.S. Provisional Application No. 63/371,219, entitled "AP MLD Power Management", filed Aug. 11, 2022; all of which are hereby incorporated herein by reference in their entirety, and made part of the present U.S. Utility patent application for all purposes.

TECHNICAL FIELD OF THE INVENTION

The present application relates generally to wireless communications, and more specifically to power management in wireless devices.

DESCRIPTION OF RELATED ART

Wireless devices that include access points APs can go to sleep if all stations (STAs) associated with the wireless device support individual target wake times (TWTs) and have individual TWT agreements with individual APs Currently, however, With the associated STAs support broadcast TWT only, the AP can't go to sleep. It is not clear how a STA does association with the AP that can go to sleep. Also, no procedures are currently defined for AP power save modes under multiple basic service set identifiers (BSSIDs). It is not clear how an AP with multiple RF chains saves power when the AP is always ready to receive the frames addressed to it. It is not clear whether an AP can save power by not decoding the whole PPDU if the PPDU doesn't carry the frames for the AP. Another issue with current wireless device power management schemes is that an AP doesn't have the power management mode and that associated STAs can't request an AP to wake from doze state. One or more APs may be affiliated with an AP MLD. It is not clear how the AP MLD, e.g. the AP MLD with single AP, implements the power management.

BRIEF DESCRIPTION OF THE SEVERAL VIEWS OF THE DRAWING(S)

FIG. 14 is a timing diagram illustrating multiple options for station (STA) association time periods in an access point according to various embodiments of the present disclosure;

FIG. 17 is another flow chart illustrating an AP power save mode without TWT according to various embodiments of the present disclosure;

FIG. 18 is a flowchart illustrating additional features of an AP power save mode without TWT according to various embodiments of the present disclosure;

FIGS. 22A-22F, are flow diagrams illustrating various options regarding use of the time period for requesting an AP to wake according to various embodiments of the present disclosure;

FIG. 34 is a diagram illustrating AP mode switch time in RNR in accordance with various embodiments of the present disclosure; and FIG. 35 is a block diagram illustrating AP Mode Switch Time in a Basic Multi-Link Element in accordance with various embodiments of the present disclosure.

DETAILED DESCRIPTION OF THE INVENTION

Description of Related Art

Figure 1:
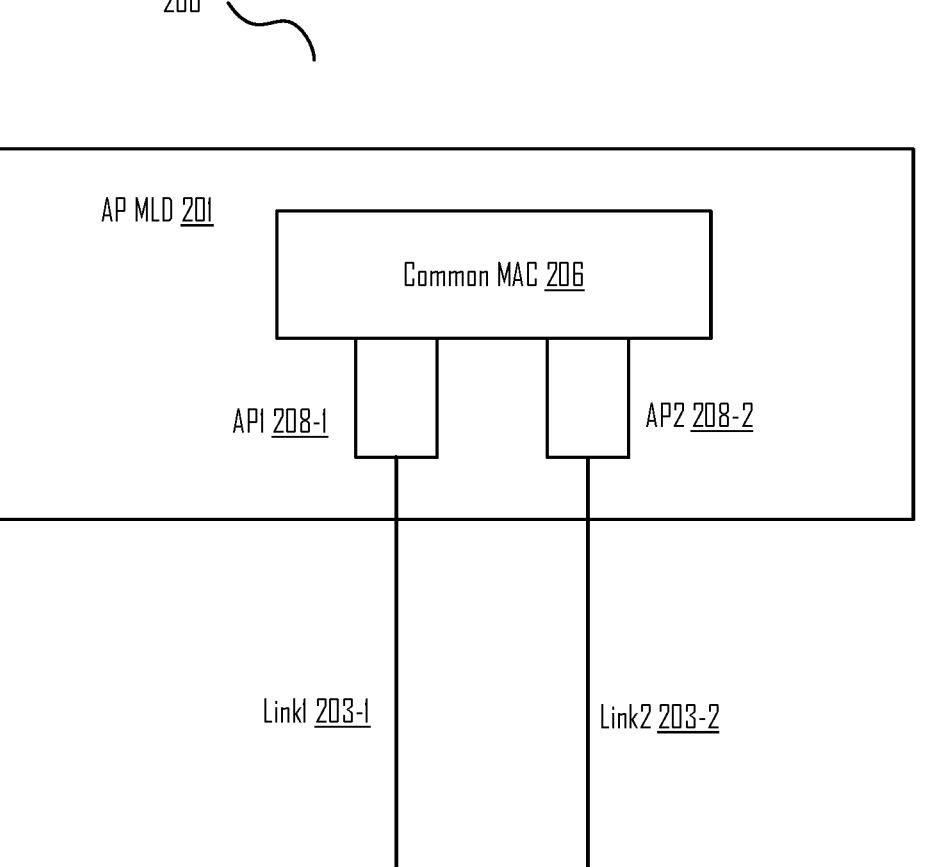
FIG. 1 is a schematic block diagram depicting a multi-link communications system used for wireless (e.g., WiFi) communications according to various embodiments of the present disclosure.

Wireless devices that include access points APs can go to sleep if all stations (STAs) associated with the wireless device support individual target wake times (TWTs) and have individual TWT agreements with individual APs Improvements to how non-AP MLDs are to deliver buffered uplink (UL) frames to an AP multi-link device (MLD) currently in a power save mode are; procedures for AP power save modes under multiple basic service set identifiers (BSSIDs); how the power save mechanism of AP MLD can be used in an AP MLD with single affiliated AP and an AP MLD which has all affiliated APs in power save mode; and improved clarity regarding how to request an AP to wake from sleep mode are possible.

One or more embodiments of APs disclosed herein employ a dynamic spatial multiplexing (SM) power save mechanism that allows a multiple-input multiple-output (MIMO) device to power down all but one of its radios for medium listening. APs disclosed herein can also employ an intra-PPDU (physical layer convergence procedure (PLCP) protocol data unit) power save mechanism, which allows the AP to enter a doze state until the end of a received PPDU if the PPDU includes no frame(s) for the AP. One or more embodiments of APs disclosed herein employ the power management modes (active mode, power save mode) with the help of TWT that allows an AP to be in doze state in some times. One or more embodiments of APs disclosed herein employ the power management modes (active mode, power save mode) without the help of TWT that allows an AP to be in doze state in some times. Various embodiments disclosed herein defines the methods that a first AP affiliated with an AP MLD assists the power management of a second AP affiliated with the same AP MLD as the first AP.

Various embodiments disclosed herein can be applied to an AP that is affiliated with an AP MLD, or an AP that is not affiliated with any AP MLD.

In embodiments of a wireless communications system, a wireless device, e.g., an access point (AP) multi-link device (MLD) of a wireless local area network (WLAN) may transmit data to at least one associated station (STA) MLD (non-AP MLD). The AP MLD may be configured to operate with associated STA MLDs according to a communication protocol. For example, the communication protocol may be an Ultra High Reliability (UHR) communication protocol, or Institute of Electrical and Electronics Engineers (IEEE) 802.11bn communication protocol. Features of wireless communications and multi-link communication systems operating in accordance with the UHR communication protocol and/or next-generation communication protocols may be referred to herein as "non-legacy" features. In some embodiments of the wireless communications system described herein, different associated STAs within range of an AP or AP MLD operating according to the UHR communication protocol are configured to operate according to at least one other "legacy" communication protocol. The "legacy" communication protocols include Extremely High Throughput (EHT) communication protocol that is compatible with IEEE 802.11be standards, High Efficiency (HE) communication protocol that is compatible with IEEE 802.11ax standards, Very High Throughput (VHT) communication protocol that is compatible with IEEE 802.11ac standards, etc.

FIG. 1 depicts a multi-link communications system 200 that is used for wireless (e.g., WiFi) communications. In the embodiment depicted in FIG. 1, the multi-link communications system includes one AP multi-link device, which is implemented as AP MLD 201, and one non-AP STA multi-link device, which is implemented as STA MLD (non-AP MLD) 213. The multi-link communications system can be used in various applications, such as industrial applications, medical applications, computer applications, and/or consumer or enterprise applications. In some embodiments, the multi-link communications system may be a wireless communications system, such as a wireless communications system compatible with an IEEE 802.11 protocol. For example, the multi-link communications system may be a wireless communications system compatible with an IEEE 802.11bn protocol. Although the depicted multi-link communications system 200 is shown in FIG. 1 with certain components and described with certain functionality herein, other embodiments of the multi-link communications system may include fewer or more components to implement the same, less, or more functionality. For example, in some embodiments, the multi-link communications system includes a single AP MLD and multiple associated STA MLDs, or multiple AP MLDs and multiple STA MLDs with each STA MLD being associated with an AP MLD. In some embodiments, the legacy STAs (non-HE STAs) associate with one of the APs affiliated with the AP MLD. In some embodiment an AP MLD may have a single affiliated AP. In some embodiment a STA MLD may have a single affiliated STA. In another example, although the multi-link communications system is shown in FIG. 1 as being connected in a certain topology, the network topology of the multi-link communications system is not limited to the topology shown in FIG. 1.

In the embodiment depicted in FIG. 1, the AP MLD 201 includes a common MAC 206 and two APs 208-1, 208-2 in two links. In such an embodiment, the APs may be AP1 208-1 and AP2 208-2. In some embodiments, a common MAC 206 of the AP MLD 201 implements upper layer Media Access Control (MAC) functionalities (e.g., association establishment, reordering of frames, etc.) and a link specific part of the AP MLD 201, i.e., the APs 208-1 and 208-2, implement lower layer MAC functionalities (e.g., backoff, frame transmission, frame reception, etc.), PHY layer functionalities, radios. The APs 208-1 and 208-2 may be implemented in hardware (e.g., circuits), software, firmware, or a combination thereof. The APs 208-1 and 208-2 may be fully or partially implemented as an integrated circuit (IC) device. In some embodiments, the APs 208-1 and 208-2 may be wireless APs compatible with at least one WLAN communications protocol (e.g., at least one IEEE 802.11 protocol). For example, the APs 208-1 and 208-2 may be wireless APs compatible with the IEEE 802.11bn protocol.

In some embodiments, an AP MLD (e.g., AP MLD 201) connects to a local area network (e.g., a LAN) and/or to a backbone network (e.g., the Internet) through a wired connection and wirelessly connects to wireless STAs, for example, through one or more WLAN communications protocols, such as an IEEE 802.11 protocol. In some embodiment, an AP (e.g., AP1 208-1 and/or AP2 208-2) includes multiple RF chains. In some embodiments, an AP (e.g., AP1 208-1 and/or AP2 208-2) includes at least one antenna, at least one transceiver operably connected to the at least one antenna, and at least one controller operably connected to the corresponding transceiver. In some embodiments, at least one transceiver includes a physical layer (PHY) device. The at least one controller may be configured to control the at least one transceiver to process received packets through the at least one antenna. In some embodiments, the at least one controller may be implemented within a processor, such as a microcontroller, a host processor, a host, a digital signal processor (DSP), or a central processing unit (CPU), which can be integrated in a corresponding transceiver. In some embodiments, each of the APs 208-1 or 208-2 of the AP MLD 201 with multiple RF chains may operate in a different BSS operating channel (in a different link). For example, AP1 208-1 may operate in a 320 MHz (one million hertz) BSS operating channel at 6 GHz band and AP2 208-2 may operate in a 160 MHz BSS operating channel at 5 GHz band. Although the AP MLD 201 is shown in FIG. 1 as including two APs, other embodiments of the AP MLD 204 may include more than two APs, or one AP only.

In the embodiment depicted in FIG. 1, the non-AP STA multi-link device, implemented as STA MLD 213, includes a common MAC 216, two non-AP STAs 205-1 and 205-2 in two links. In such an embodiment, the non-AP STAs may be STA1 205-1 and STA2 205-2. The STAs 205-1 and 205-2 may be implemented in hardware (e.g., circuits), software, firmware, or a combination thereof. The STAs 205-1 and 205-2 may be fully or partially implemented as an IC device. In some embodiments, the non-AP STAs 205-1 and 205-2 are part of the STA MLD 213, such that the STA MLD may be a communications device that wirelessly connects to a wireless AP MLD. For example, the STA MLD 213 may be implemented in a laptop, a desktop personal computer (PC), a mobile phone, or other communications device that supports at least one WLAN communications protocol. In some embodiments, the non-AP STA MLD 213 is a communications device compatible with at least one IEEE 802.11 protocol (e.g., an IEEE 802.11bn protocol, an IEEE 802.11be protocol, an IEEE 802.11ax protocol, or an IEEE 802.11ac protocol). In some embodiments, the STA MLD 213 implements a common MAC functionalities 216 and the non-AP STAs 205-1 and 205-2 implement a lower layer MAC data functionalities, PHY functionalities.

In some embodiments, the AP MLD 201 and/or the STA MLD 213 may identify which communication links support multi-link operation during a multi-link operation setup phase and/or exchanges information regarding multi-link capabilities during the multi-link operation setup phase. In some embodiments, each of the non-AP STAs 205-1 and 205-2 of the STA MLD 213 in different link may operate in a different frequency band. For example, the non-AP STA1 205-1 in one link may operate in the 2.4 GHz frequency band and the non-AP STA2 205-2 in another link may operate in the 5 GHz frequency band. In some embodiments, each STA includes at least one antenna, at least one transceiver operably connected to the at least one antenna, and at least one controller connected to the corresponding transceiver. In some embodiments, at least one transceiver includes a PHY device. The at least one controller may be configured to control the at least one transceiver to process received packets through the at least one antenna. In some embodiments, the at least one controller may be implemented within a processor, such as a microcontroller, a host processor, a host, a DSP, or a CPU, which can be integrated in a corresponding transceiver.

In the embodiment depicted in FIG. 1, the STA MLD 213 communicates with the AP MLD 201 via two communication links, e.g., link 1 102-1 and link 2 102-2. For example, each of the non-AP STAs 203-1 or 203-2 communicates with an AP 208-1 or 208-2 via corresponding communication links 102-1 or 102-2. In an embodiment, a communication link (e.g., link 1 102-1 or link 2 102-2) may include a BSS operating channel established by an AP (e.g., AP1 208-1 or AP2 208-2) that features multiple 20 MHz channels used to transmit frames (e.g., Beacon frames, management frames, etc.) being carried in Physical Layer Convergence Protocol (PLCP) Protocol Data Units (PPDUs) between a first wireless device (e.g., an AP, an AP MLD, an STA, or an STA MLD) and a second wireless device (e.g., an AP, an AP MLD, an STA, or an STA MLD). In some embodiments, a 20 MHz channel may be a punctured 20 MHz channel or an unpunctured 20 MHz channel. Although the STA MLD 213 is shown in FIG. 1 as including two non-AP STAs, other embodiments of the STA MLD 213 may include one non-AP STA or more than two non-AP STAs. In addition, although the AP MLD 201 communicates (e.g., wirelessly communicates) with the STA MLD 213 via multiple links 102-1 and 102-2, in other embodiments, the AP MLD 201 may communicate (e.g., wirelessly communicate) with the STA MLD 213 via more than two communication links or less than two communication links.

Figures 2, 3:
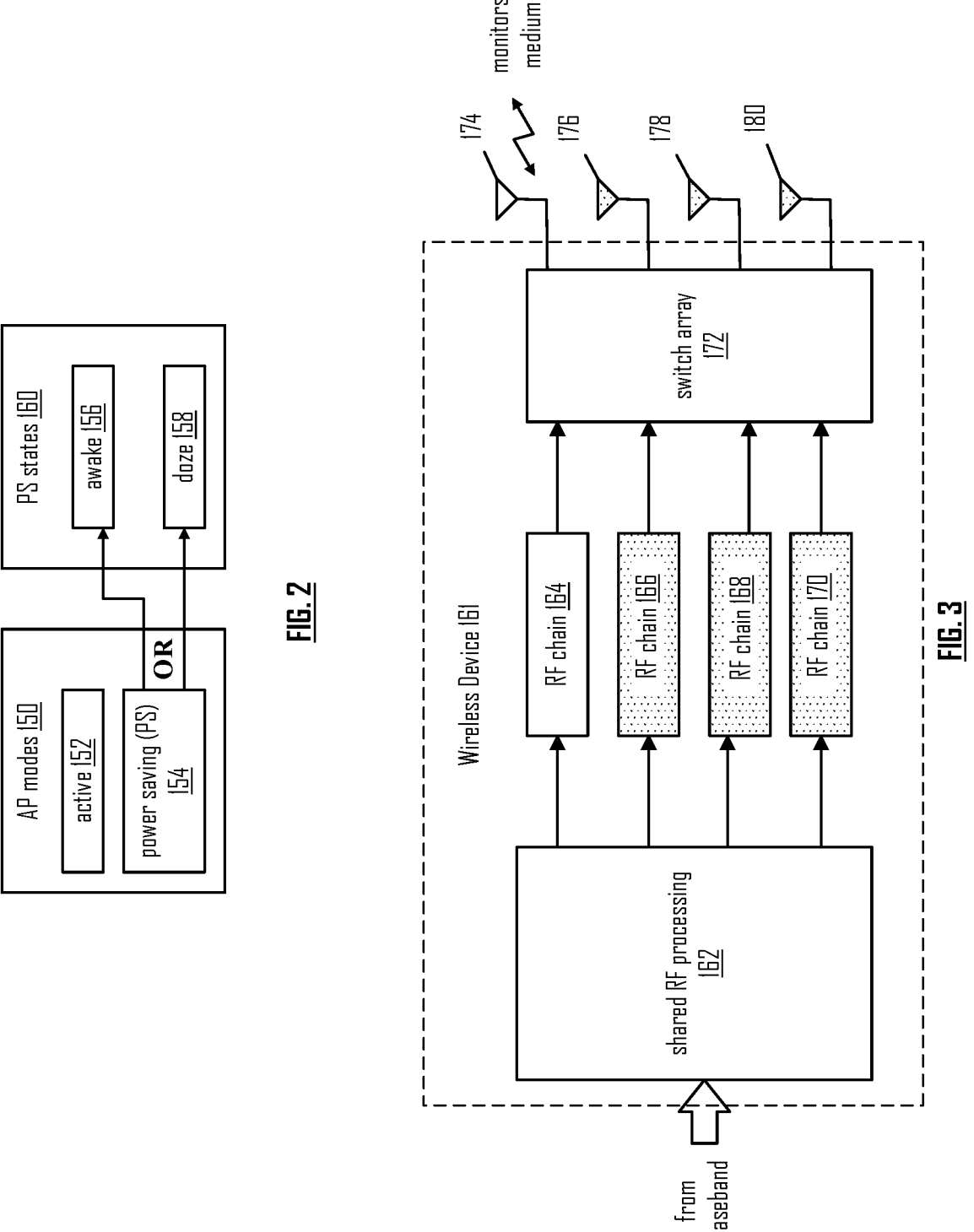
FIG. 2 is a schematic block diagram illustrating a relationship between access point (AP) power management modes and AP awake/doze states according to various embodiments of the present disclosure.
FIG. 3 is a schematic block diagram of a wireless device wireless device that keeps one RF chain in an awake power save state to monitor a medium, while other RF chains are in a doze power save state, according to various embodiments of the present disclosure.

Referring next to FIG. 2, in one embodiment, the relationship between access point (AP) power management modes and power save states will be discussed in accordance with various embodiments of the present disclosure. The AP power management modes 150 include active mode 152 and power saving (PS) mode 154. The AP power save mode includes two power save states, i.e. awake state 156 and doze state 158. During AP active mode 152 or AP awake state an AP is currently engaging in communication with one or more other devices, such as stations (STAs), or is currently capable of: initiating communications with one or more other devices; receiving communications from one or more other devices; and responding to those received communications.

During AP power saving (PS) mode 154, the AP can be in one of two states: awake state 156 or doze state 158. In doze state 158, the AP is not currently capable of communicating with other devices, and does not even perform media monitoring to detect communications from other devices. Thus, a wake-up request sent to an AP that is in doze state 158 will not be detected.

During a time the AP is in awake state 156 under power save mode 154, the AP monitors the wireless medium for incoming communications, and is capable of acting on received messages, and is involved in active communications with other devices.

Referring next to FIG. 3, a dynamic Spatial Multiplexing (SM) power save, in which wireless device 161 that keeps one RF chain active to monitor a medium, while other RF chains are turned off, will be discussed in accordance with various embodiments of the present disclosure. In at least one such embodiment, an AP that is in active mode (or in awake state) and has multiple RF chains can save power through using one RF chain to monitor the medium. If an initiating frame of a TXOP for the AP is received, the AP can turn on the other RF chains to do the frame exchanges by using multiple RF chains within the remaining time of the TXOP. Wireless device 161 is, in at least one embodiment, an AP affiliated with a multi-link access point device (AP MLD) or an AP that is unaffiliated with the AP MLD. Wireless device 161 includes shared RF processing circuitry 162, switch array 172, RF chain 164 and associated antenna 174, RF chain 166 and associated antenna 176, RF chain 168 and associated antenna 178, and RF chain 170 and associated antenna 180. As used herein, the term "RF chain" refers to a cascade of electronic components and sub-units used for RF transmission and/or reception in a frequency or frequency band. An RF chain may include, but is not limited to, amplifiers, filters, mixers, attenuators, and detectors.

As illustrated in FIG. 3, wireless device 161 turns off RF chain 166, RF chain 168, and RF chain 170 to conserve power, but keeps RF chain 164 active to perform clear channel assessment (CCA) of the wireless medium. CCA involves listening for RF transmissions at the Physical layer. If an initiating frame of a TXOP addressed to wireless device 161 is received through RF chain 164, wireless device 161 will activate its other RF chain 166, 168, and 170 to do the frame exchanges in the remaining time of the TXOP.

Figures 4, 5:
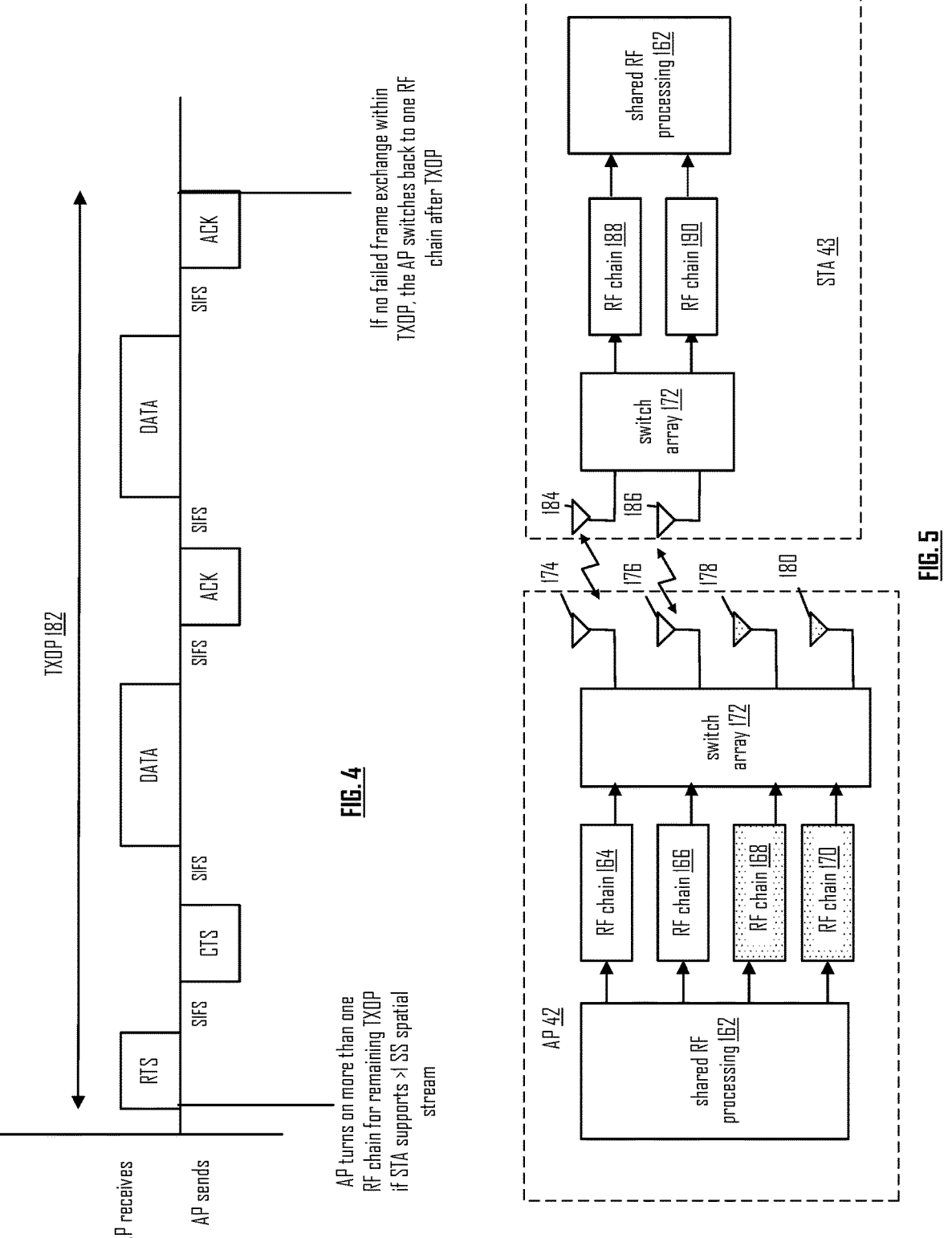
FIG. 4 is a timing diagram illustrating a transmit opportunity (TXOP) mechanism according to various embodiments of the present disclosure.
FIG. 5 is a schematic block diagram illustrating a multi-link access point device (AP MLD) that uses multiple RF chains to communicate with a non-AP MLD according to various embodiments of the present disclosure.

Referring next to FIG. 4, a transmit opportunity (TXOP) mechanism will be discussed in accordance with various embodiments of the present disclosure. A TXOP defines a time duration during which an AP or STA can send frames after it has gained contention for the transmission medium. TXOPs provide a protection mechanism that causes potentially interfering transmission to be deferred for a period of time. In various embodiments, an AP or that has possession of a TXOP can share all or a portion of that TXOP with other devices.

For purposes of this example, assume that the AP includes multiple RF chains, and all but one of the RF chains is turned off, while the remaining single RF chain is active to monitor the wireless medium. At the beginning of TXOP 182, the TXOP holder transmits a frame by using one spatial stream (1 SS), e.g. RTS or another frame, to the AP and the access point (AP) receives the Request To Send (RTS) frame addressed to the AP. In one embodiment, an RTS or other frame being in UHR PPDU with 1 SS or non-HT duplicate PPDU is used to make the AP to turn on its inactive RF chain(s). In another embodiment, RTS frames that are used to gain control of the transmission medium for the transmission of "large" frames, in which "large" is defined by a predetermined RTS threshold, can also be used to make the AP to turn on its inactive RF chain(s).

In response to receiving the RTS, the AP transmits CTS and turns on the other RF chains for the duration of the TXOP. Receipt of the RTS frame is followed by a Short Interframe Space, which provides time for a wireless interface to process and begin transmitting a response to a received frame. The AP responds to the RTS frame with a Clear to Send (CTS) frame and turns on the other RF chains, indicating that control of the medium has been passed to the device that transmitted the RTS frame. The CTS is followed by another SIFS, allowing the requesting device to begin transmitting data by using multiple spatial streams (SS), which is received at the AP. After another SIFS, the AP transmits an acknowledgement (ACK), which is followed by another SIFS, more data, yet another SIFS, and another ACK.

If there were no failed frame exchanges within the TXOP, the AP switches back to using a single RF chain to monitor the medium, and turns off the remaining RF chains at the end of the TXOP. A frame exchange is considered to be a failed frame exchange by the AP as the TXOP responder if it detects medium idle longer than PIFS after the previous frame exchange with it, it detects a frame that is not addressed to it, e.g. by checking receiver address (RA), or the Address3 in a medium access control layer (MAC) header where neither RA nor Address 3 is AP's BSSID, or it detects an OBSS PPDU for example by checking the basic service set (BSS) color in the PHY header that is not the BSS color announced by the AP, a downlink/uplink (DL/UL) indication in a physical layer (PHY) header that indicates DL PPDU. A frame exchange is considered to be a failed frame exchange by the TXOP holder if the TXOP holder does not receive the responding frame from the AP SIFS after the TXOP holder transmits the frame(s) in a PPDU to solicit the responding frame. With the failed frame exchange, the TXOP holder cannot transmit the following frame(s) to the AP with inter-frame space shorter than PIFS. PIFS medium idle refers to an interframe spacing wider than a short interframe spacing (SIFS). After the failed frame exchange, the TXOP holder may transmit the following frame(s) to the AP after the medium is idle for PIFS or after the backoff procedure. A frame exchange is also considered a failed frame exchange if a frame address to the STA from a device other than the AP is detected. A third indicator of a failed frame exchange is when a PPDU of an overlapping basic service set (OBSS) is detected.

Referring next to FIG. 5, an AP that uses multiple RF chains to communicate with a STA will be discussed in accordance with various embodiments of the present disclosure. An AP MLD including AP 42 can be implemented using wireless device 161, illustrated in FIG. 3. AP 42 includes: RF chain 164, shown using antenna 174; RF chain 166, shown using antenna 176; RF chain 168, shown using antenna 178, and RF chain 170, shown using antenna 180. STA 43 includes RF chain 188 with associated antenna 184, and RF chain 190 with associated antenna 186. The state of the RF chains in AP 42 are shown after the AP 42 has turned on additional links in response to the RTS shown in FIG. 4. In this example, AP 42 has transitioned RF chain 164 and RF chain 166 into their active modes, so that communication with STA 43 can use two RF chains.

In one embodiment, once the AP detects the failed frame exchange with the STA as the TXOP holder, the AP will have one RF chain to be active for medium monitoring and turn off its other RF chains. In such embodiment, the AP cannot use dynamic SM power save to save power if its BSS includes STAs that do not support the AP's dynamic SM power save. In one embodiment, each STA associated with the AP or each STA affiliated with a non-AP MLD associated with an AP MLD announces whether it supports AP's dynamic SM power save. In one embodiment, an AP not affiliated with any AP MLD or an AP affiliated with an AP MLD announces whether it enables its dynamic SM power save operation, and if the AP announces its enablement of dynamic SM power save operation, each STA associated with the AP needs to transmit the initial frame (RTS as an example) by using 1 spatial stream (SS), or in non-High Throughput (non-HT) duplicate PPDUs.

Figures 6, 7:
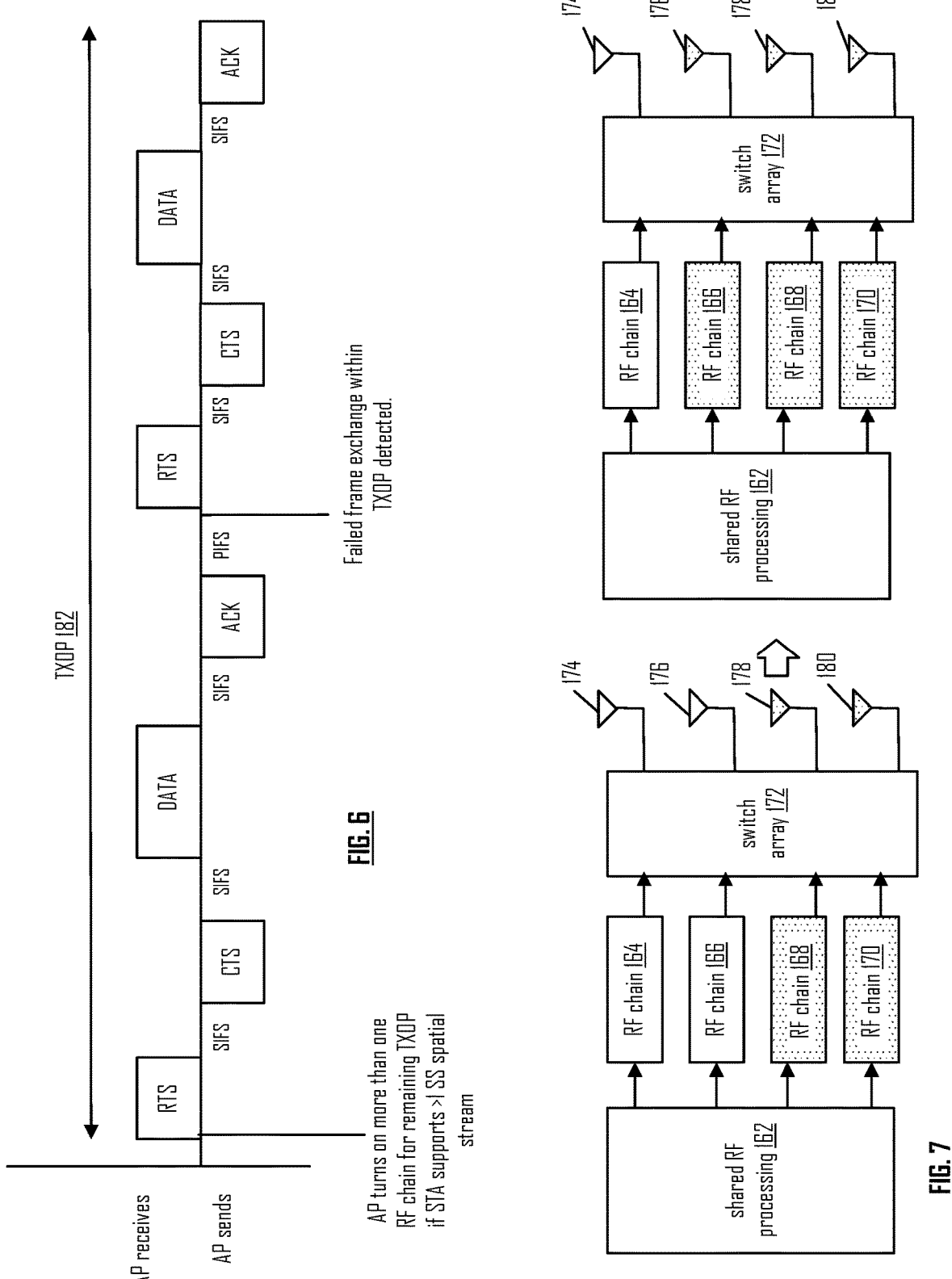
FIG. 6 is another timing diagram illustrating a transmit opportunity (TXOP) mechanism according to various embodiments of the present disclosure.
FIG. 7 is schematic block diagram illustrating an access point (AP) using different numbers of RF chains for transmission according to various embodiments of the present disclosure.

Referring next to FIG. 6, another transmit opportunity (TXOP) mechanism will be discussed in accordance with various embodiments of the present disclosure. The TXOP frames transmitted during the TXOP 182 are the same as those shown in FIG. 4, with the exception of a failed frame exchange during the second data frame. In this example, upon detecting a failed frame exchange that occurs when using multiple RF chains to transfer data, the AP returns all but one of its RF chains to be turned off, and leaves a single RF chain in the active mode to finish the data exchange. In one embodiment, the STA will stop the TXOP by using multiple RF chains to transmit the frames to the AP by using the remaining time of the TXOP. In another embodiment, after PIFS idle medium or backoff the STA will continue the TXOP by transmitting another RTS with 1 SS to let the AP to turn on all its RF chains.

Referring next to FIG. 7, an access point (AP) using different numbers of RF chains for transmission will be discussed in accordance with various embodiments of the present disclosure. The left side of FIG. 7 shows the turned-on/turned-off of the RF chains in the AP after the AP places more than one of its RF chain in an active mode in response to the RTS. In particular, the shaded RF chains 168 and 170 are turned off, while the unshaded RF chains 164 and 166 are turned on.

The right side of FIG. 7 shows the turned-on/turned-off of the RF chains in the AP after the AP returns all but one of its RF chains to be turned off in response to a failed frame exchange during the TXOP. In particular, the shaded RF chains 166, 168 and 170 are turned off, while the unshaded RF chain 164 is turned on.

In one embodiment, an AP affiliated with an AP MLD or not affiliated with an AP MLD enables its dynamic SM power save implicitly if all the associated STAs supports HE operation. In such embodiment, the AP announces the TXOP Duration RTS Threshold subfield in HE Operation element to be zero so each associated STA initiates every TXOP with the AP by transmitting the RTS. The AP uses its one RF chain to monitor the wireless medium and turns on its other RF chains after receiving the RTS to it. In some embodiment, the AP keeps its multiple RF chains turned-on until the end of the TXOP even if there is frame exchange error within the TXOP.

Figure 8:
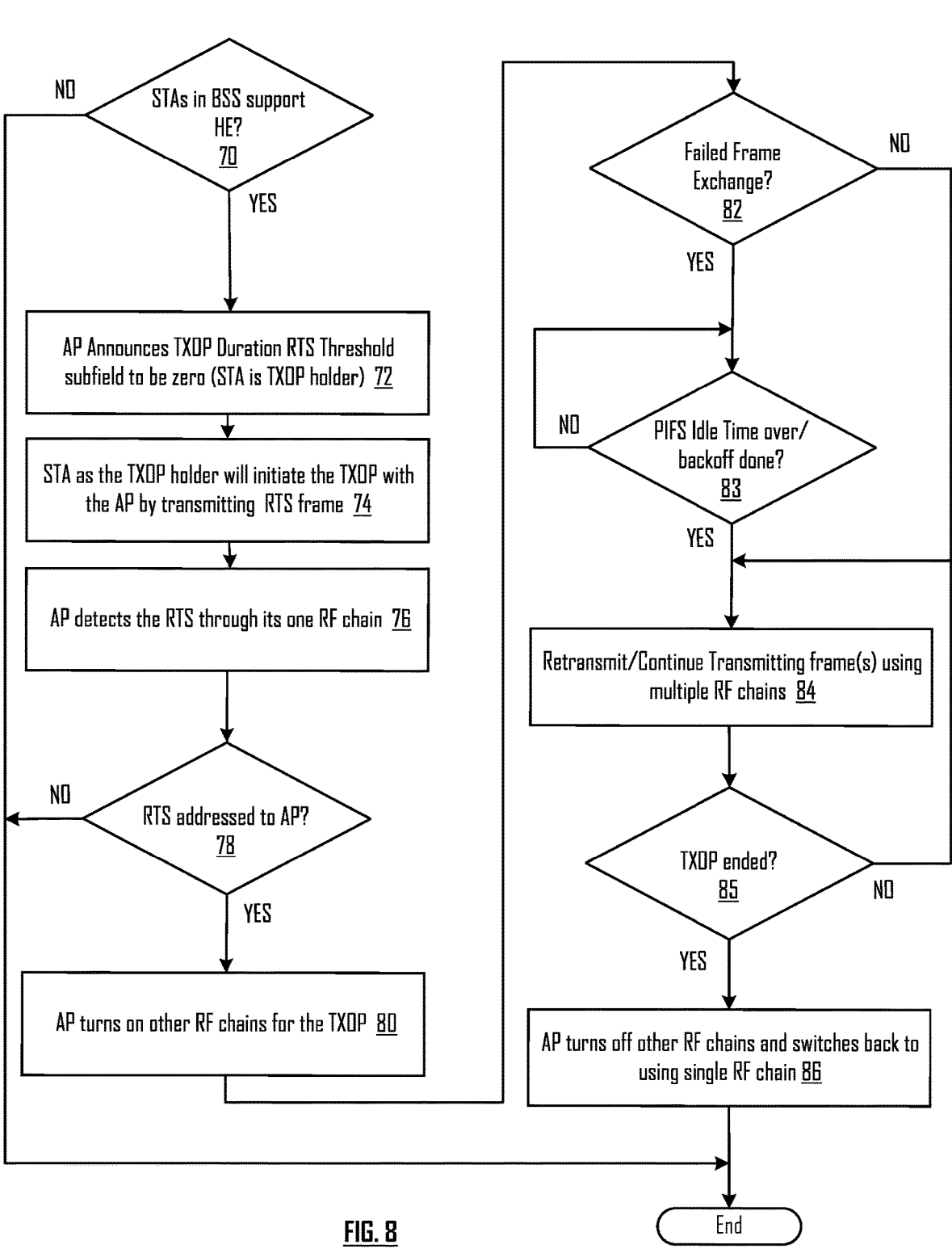
FIG. 8, is a flow chart illustrating additional embodiments of TXOP mechanisms in accordance with embodiments of the present disclosure.

Referring next to FIG. 8, a flow chart illustrating additional embodiments of TXOP mechanisms will be discussed in accordance with embodiments of the present disclosure. As illustrated by block 70, if all the STAs in the BSS support high efficiency (HE) operations, such as those specified in IEEE 802.11ax, the method proceeds to block 72, otherwise the method ends. As illustrated by block 72, an AP Announces TXOP Duration RTS Threshold subfield to be zero. As the TXOP holder, the STA will initiate the TXOP with the AP by transmitting an RTS frame, as illustrated by block 74.

As illustrated by block 76, the AP detects the RTS through the single RF chain that is used to monitor the medium. The AP determines, at block 78, whether the RTS is addressed to the AP. If not, the method ends. If, however, the RTS is addressed to the AP, the AP turns on one or more additional RF chains for the duration of the TXOP, as illustrated by block 80.

As illustrated by block 82, a check is made to determine whether there has been a failed frame exchange. As illustrated by blocks 84 and 85, if there is no failed frame exchange during the TXOP, the STA continues to transmit frames for the remainder of the TXOP using multiple RF chains. As illustrated by block 86, at the end of the TXOP, the AP will turn off all but one of its RF chains.

If, however, it is determined at block 82 that there has been a failed frame transmission, in some embodiments the AP will keep its RF chains active until the end of the TXOP, even if the AP detects failed frame exchanges. In some such embodiments, a check is made to determine if the PIFS idle time is over or the backoff is done, as shown by block 83. As one option, if the PIFS idle time has not ended, the method waits until the PIFS idle time has completed, and then proceeds to block 84, where an attempt can be made to re-transmit the failed frame and/or to continue transmitting additional frames for the remainder of the TXOP. As another option if the backoff procedure has not ended, the method waits until the backoff has completed, and then proceeds to block 84, where an attempt can be made to re-transmit the failed frame and/or to continue transmitting additional frames for the remainder of the TXOP.

In one embodiment, an AP that doesn't support power management mode or supports power save mode and is in an active mode (or an awake state) of power save mode can save power by using AP's intra-PPDU power save. In some such embodiments, when an AP detects a PPDU that is not directed to it, for example based on the PHY header and/or the MAC header, the AP can stop decoding the PPDU and turn off its MAC/PHY functionality until the end of the PPDU. The PHY header information can include BSS Color, UL/DL indication in PHY header. The MAC header information can include the various MAC address fields (RA, TA, BSSID, SA, DA) in the MAC header.

Figure 9:
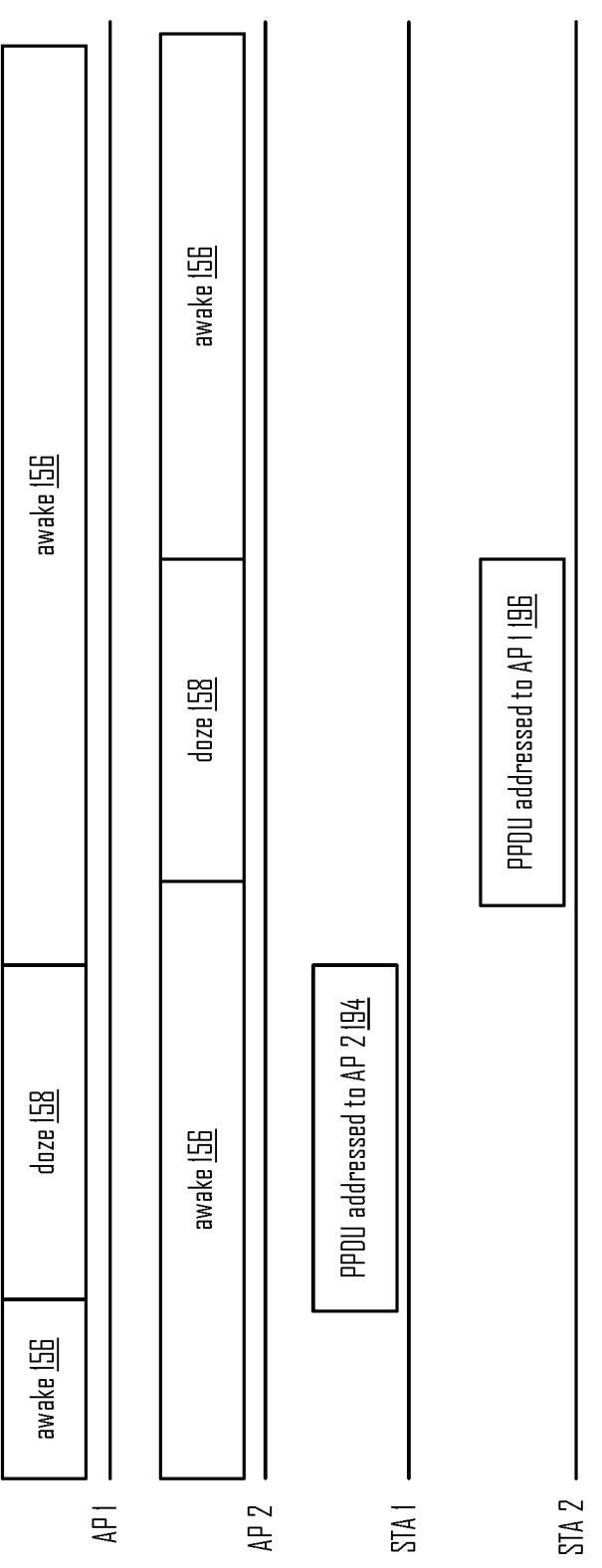
FIG. 9 is timing diagram illustrating an intra PPDU power save according to various embodiments of the present disclosure.

Referring next to FIG. 9, an intra PPDU power save will be discussed in accordance with various embodiments of the present disclosure. It should be noted that Intra-PPDU power save operates independently of a power management mode (active, power save mode) an AP. An AP that doesn't support power management modes or is in active mode can still save power through intra-PPDU power save. An AP that is in power save mode can further save power through intra-PPDU power save.

As illustrated in FIG. 9, STA 1 transmits PPDU 194, during a time when AP1 is in a doze state 158, and AP 2 is awake state or active mode 156, In one example, because AP1 is in the doze state, it is not monitoring the medium. Consequently, AP1 is unaware that PPDU 194 has even been transmitted. By contrast, AP 2 is in awake state 156, and is monitoring the medium when STA 1 transmits PPDU 194. As a result, AP 2 will detect PPDU 194. If AP2 finds that the BSS color in the PHY header of PPDU 194 is same as what AP2 announced, the UL/DL indication in PHY header of PPDU 194 indicates UL PPDU and the various MAC address fields in MAC header indicate the frame(s) in PPDU 194 is for AP2, AP2 determines that PPDU 194 is addressed to AP 2, and act on PPDU 194 as appropriate until the end of PPDU 194. AP2 will stop the decoding of PPDU 194 and turn off it MAC/PHY functionality until the end of the PPDU if one if the following is true: 1) the BSS color in the PHY header of PPDU 194 is different from what AP2 announced, 2) the UL/DL indication in PHY header of PPDU 194 indicates DL PPDU, 3) the various address fields in MAC header indicate the frame(s) in PPDU 194 is not for AP2.

At a later time STA 2 transmits PPDU 196. PPDU 196 is transmitted at a time when AP 1 is in an awake state or active mode 156, and AP 2 is in a doze state. Because AP 2 is in the doze state, it is not monitoring the medium, and is unaware of the existence of PPDU 196. By contrast, AP 1 is in awake state or active mode 156, and is monitoring the medium when STA 2 transmits PPDU 196. As a result, AP 1 will detect PPDU 196. If AP1 finds that the BSS color in the PHY header of PPDU 196 is same as what AP1 announced, the UL/DL indication in PHY header of PPDU 196 indicates UL PPDU and the various MAC address fields in MAC header indicate the frame(s) in PPDU 196 is for AP1, AP1 determines that PPDU 196 is addressed to AP 1, and act on PPDU 196 as appropriate until the end of PPDU 196. AP1 will stop the decoding of PPDU 196 and turn off it MAC/PHY functionality until the end of PPDU 196 if one if the following is true: 1) the BSS color in the PHY header of PPDU 196 is different from what AP1 announced, 2) the UL/DL indication in PHY header of PPDU 196 indicates DL PPDU, 3) the various address fields in MAC header indicate the frame(s) in PPDU 196 is not for AP1.

Determining by the access point whether the PPDU is addressed to it can be performed based on The PHY header. If the detected PPDU was a downlink (DL) PPDU, the PPDU is not for the AP and could be ignored. Additionally, the basic service set (BSS) color indicated by the PPDU can be compared to the BSS color announced by the AP. If the color is not the same, the PPDU is not for the AP and can be ignored. Additionally, a check can be made to determine if the receiver address (RA) of the frame carried in the PPDU is the BSSID of the AP. If the RA is not same as the AP's BSSID, the PPDU that carries the frame is not for the AP and can be ignored. Furthermore, if the address 3 of a received management frame with broadcast RA in the PPDU is not within the APs BSSID, the PPDU is not for the AP and can be ignored.

Figure 10:
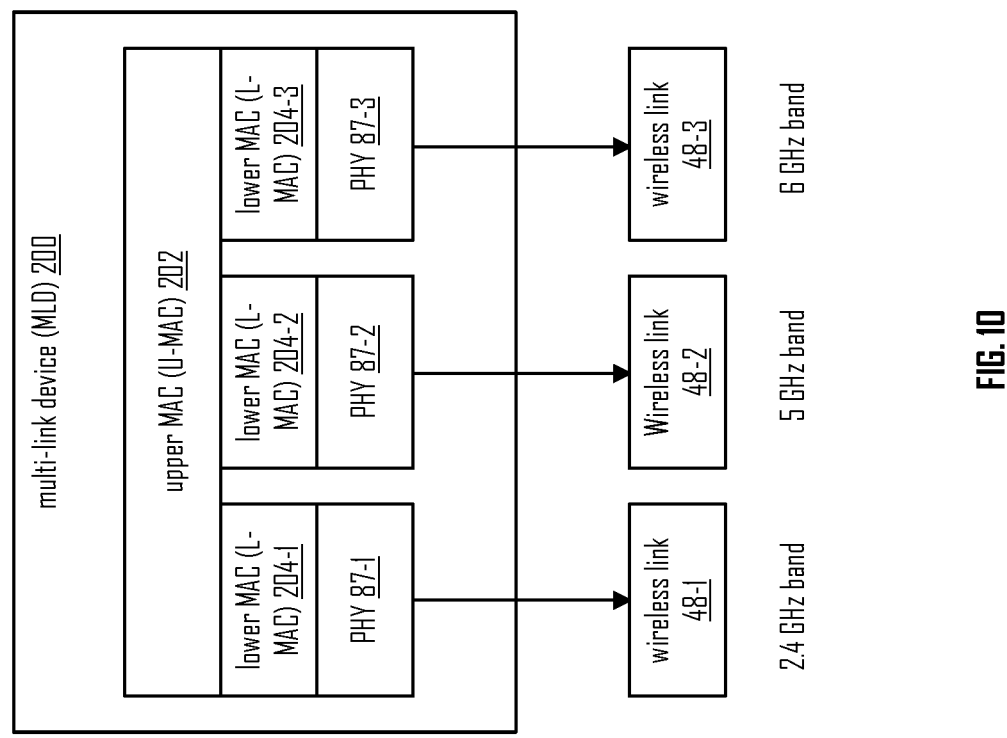
FIG. 10 is a schematic block diagram of a multi-link device (MLD) according to various embodiments of the present disclosure.

Referring next to FIG. 10 the architecture of a multi-link device (MLD) 200 will be discussed in accordance with various embodiments of the present disclosure. MLD 200 includes an upper medium access control (U-MAC) 202; multiple lower MACs (L-MACs), including L-MAC 204-1, L-MAC 204-2, and L-MAC 204-3; multiple PHYs, including PHY 87-1 paired with L-MAC 204-1 with the RF chain(s) for wireless link 48-1, PHY 87-2 paired with L-MAC 204-2 with the RF chain(s) for wireless link 48-2, and PHY 87-3 paired with L-MAC 204-3 with the RF chain for wireless link 48-3. In at least some embodiments, wireless link 48-1 is in the 2.4 GHz band, wireless link 48-2 is in the 5 GHz band, and wireless link 48-3 is in the 6 GHz band. MLD 200 as AP MLD is, in various embodiments, capable of simultaneous transmit receive operation (STR).

Figure 11:
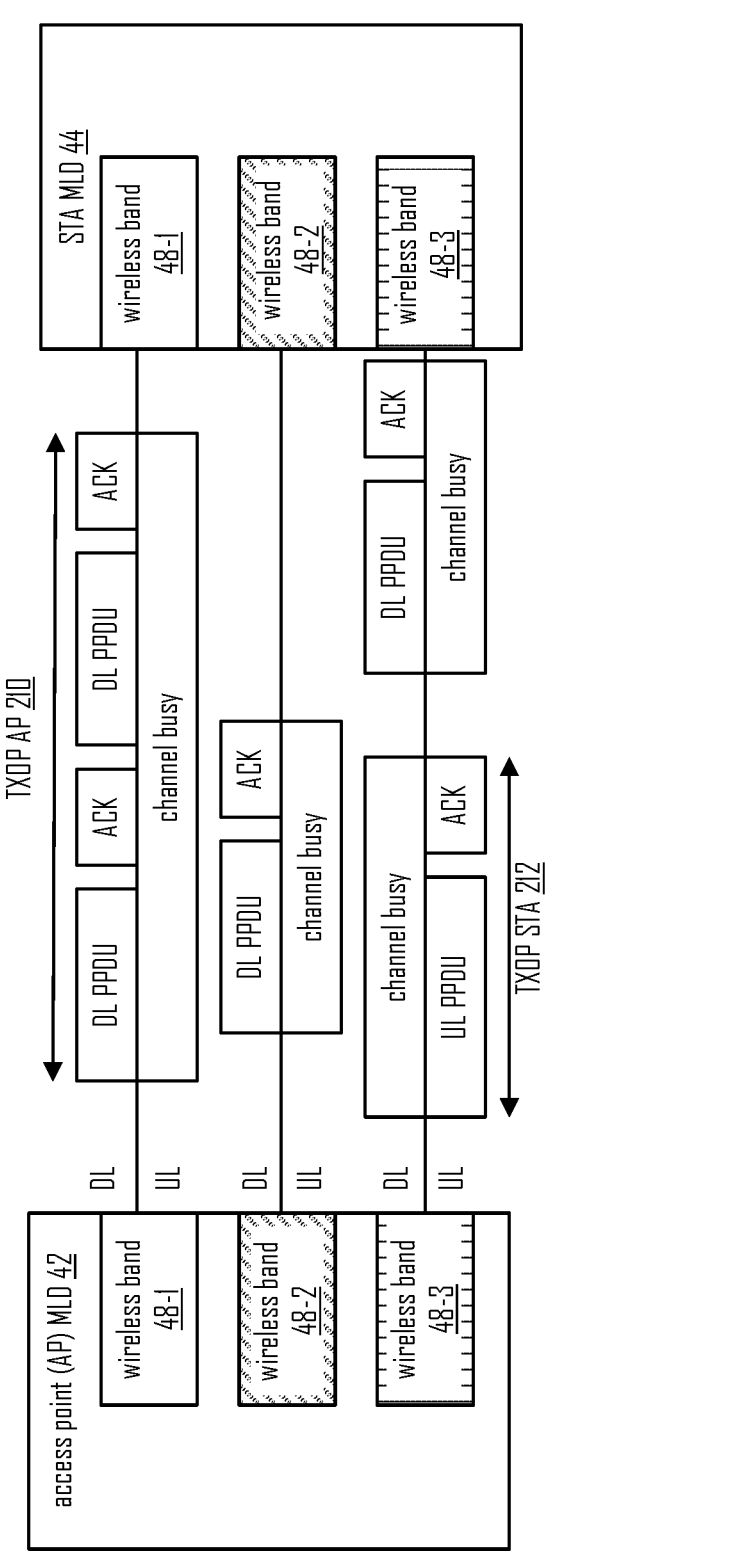
FIG. 11 is a schematic block diagram of asynchronous transmission mode (ATM) and channel access with simultaneous transmission and receive (STR) according to various embodiments of the present disclosure.

Referring next to FIG. 11 asynchronous transmission mode (ATM) and channel access with simultaneous transmit and receive (STR) will be discussed in accordance with various embodiments of the present disclosure. AP MLD 42 and STA MLD 44 are each capable of communicating via three different wireless links 48-1, 48-2, and 48-3. AP MLD 42 and STA MLD 44 can each transmit simultaneously on different wireless links, although simultaneous uplink (from AP to STA) and downlink (from STA to AP) transmissions in a single link is not supported. That is to say, when a wireless link is being used to transmit uplink frames or transmit downlink frames the channel is considered busy.

As illustrated in FIG. 11, during an access point transmit opportunity on wireless link 48-1, for example TXOP AP 210, the AP can transmit DL PPDUs to the STA, and the STA can transmit UL ACKs to the AP. However, at the same time that DL PPDUs are being transmitted by the AP via wireless link 48-1, the STA is transmitting UL PPDUs to the AP on wireless band 48-3. As illustrated, the UL PPDUs are transmitted during a station transmit opportunity, such as TXOP STA 212.

Figure 12:
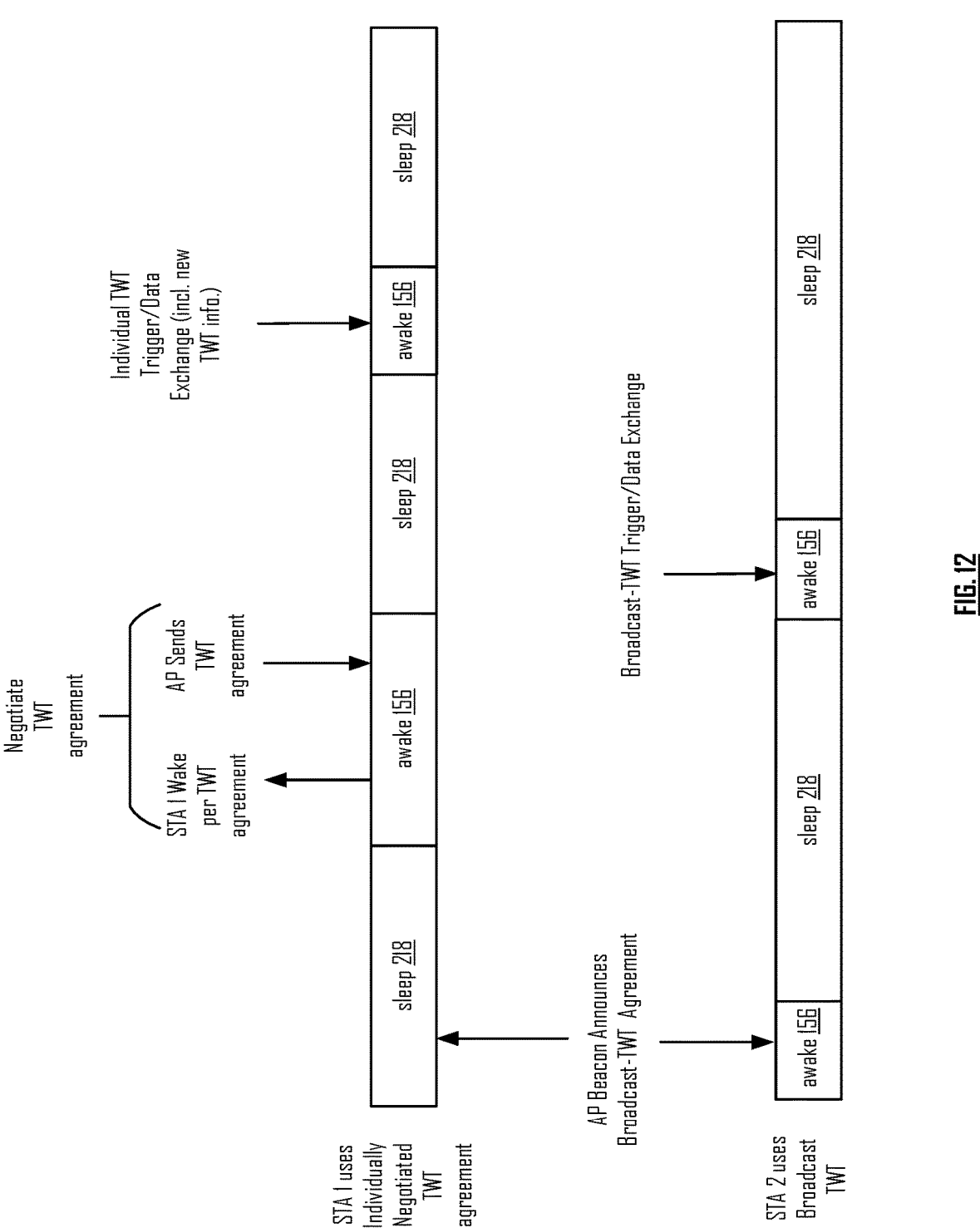
FIG. 12 is a timing diagram illustrating broadcast and individual target wake time (TWT) according to various embodiments of the present disclosure.

Referring next to FIG. 12 broadcast and individual target wake times (TWTs) will be discussed in accordance with various embodiments of the present disclosure. TWTs enable devices to determine when and how frequently they will have the opportunity to transmit data. These TWTs allow In various embodiments, the STA chooses when to execute the frame exchanges with its associated AP, and the STA can also decide when to wake up and when to sleep based on the negotiated TWT agreement(s). The STA that supports individual TWT will negotiate the individual TWT agreement with the AP. For broadcast TWTs, the AP is in charge, determines, and announces a TWT schedule/parameters. A STA that supports broadcast TWT can become the member of a broadcast TWT schedule.

STA 1 is an example of using a negotiated individual TWT. First, the STA and the AP negotiate individual TWT parameters. During negotiations, the STA transmits its suggested individual TWT parameters to the AP. The AP can either reject or accept the request with the schedule parameters suggested by the STA or with the updated TWT schedule parameters. The STA can "demand" an individual TWT parameters for agreement. If agreed, the AP will respond with "Accept TWT" with the proposed TWT parameters by the STA. The AP can counter the offer with an Alternate TWT. The TWT parameters can include a length of service period (SP) available for data transfer, the interval between two adjacent SPs, the start time of the first SP. Once the TWT parameters have been negotiated, the STA tries to be ready for frame exchanges at the start time of SPs determined by the TWT agreement.

STA2 is an example of using a broadcast TWT. The AP announces the broadcast TWT schedule(s) in its beacon frame. If STA2 would like to be the member of a broadcast schedule, STA2 negotiates the membership of the broadcast schedule with the AP. Once it is accepted as the member of the broadcast schedule, STA2 will use the broadcast TWT schedule to determine when to be ready for the exchange frames with the AP. The TWT Element might be sent in a management frame other than the beacon frame. For example it can be transmitted in an Association Response frame, a probe response frame, or the like.

Note that regardless of whether the TWT was broadcast or individually negotiated, the data exchange can be initiated by the AP sending a trigger frame, either broadcast or unicast, to one or more STAs. When trigger frames must be used, it is referred to as a trigger-enabled TWT SP.

In one embodiment, an AP's TWT power save (TWT PS) based on the AP's power management modes (active mode, power save mode with awake state and doze state) is implemented with the help of individual and/or broadcast TWT agreement(s). In one embodiment, an AP and each associated STA can announce whether it supports AP's TWT PS. In one embodiment, in order to announce being in TWT power save mode, the AP announces the requirement of the negotiation of individual TWT agreement(s) and/or becoming the member of broadcast TWT schedule(s). In the embodiment, an AP can announce the TWT power save enablement (i.e. being in TWT power save mode) if all the associated STAs support the AP's TWT power save and all associated STAs negotiate the individual TWT agreements and/or become the members of broadcast schedule(s). Within individual or broadcast TWT SPs, the AP that is in TWT power save mode is in the awake state. Outside the individual/broadcast TWT SPs, the AP that is in TWT power save mode is not available (i.e. in doze state). In one embodiment, the AP in TWT power save mode announces an additional SP (start time of the SP, duration of the SP) for STA's association. In one embodiment, the SP for STA's association is right after the Beacon transmission. In one embodiment, in order to allow STA's association, the AP is in an awake state within the SP for the association. One AP's TWT power save mode change (from active mode to power save mode or from power save mode to active mode) and the mode after the change can be announced by another AP's Beacon in the reduced neighbor report (RNR) element), in its own beacon, or in another management frame.

In at least one embodiment, each AP announces its power management mode through its own Beacon, a Probe Response, an Association Response, etc. If a first AP is affiliated with other APs in the same AP MLD, the other APs can also announce the first AP's power save mode. Additionally, when a traffic identifier (TID) maps a link to a non-AP MILD, and at least one AP in that link is in active mode, the non-AP MLD can transmit the frames of the TID to that AP. In some embodiments, when at least one AP MLD in a mapped link of a TID is in active mode, a second device refrains from buffering frames of the TID addressed to the AP MLD.

Figure 13:
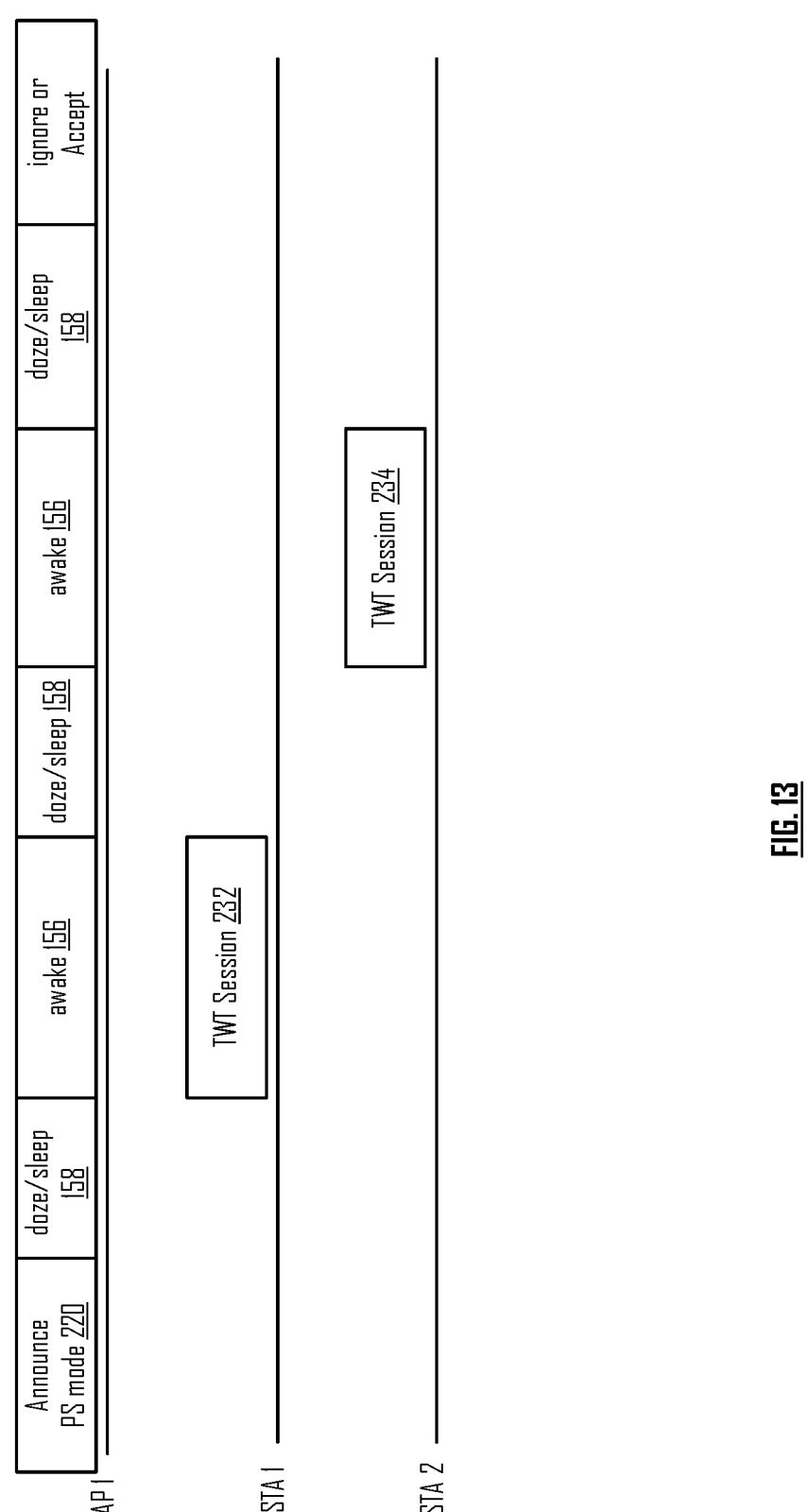
FIG. 13 is a timing diagram illustrating AP announcement of a TWT mode according to various embodiments of the present disclosure.

Referring next to FIG. 13 an AP's announcement of its TWT power save (PS) mode will be discussed in accordance with various embodiments of the present disclosure. Assume TWT SPs 232 and 234 are individual TWT SPs of two individual TWT agreements. If the AP and all associated STAs (STA1 And STA2) support individual TWTs, have individual TWT agreements and support TWT PS, the AP can announce it to be in TWT PS mode where the AP wake during individual TWT SPs 232 and 234, and sleep (in doze state) outside of negotiated individual TWT sessions. Assume TWT SPs 232 and 234 are broadcast TWT SPs of two broadcast schedules. If the AP and all associated STAs (STA1, STA2) support broadcast TWTs, negotiated the membership of two broadcast schedules and support TWT PS, the AP can announce it to be in TWT PS mode where the AP wake during broadcast TWT SPs 232 and 234, and sleep outside of the broadcast TWT SPs. Assume TWT SP 232 is the SP of an individual TWT and 234 is the SP of a broadcast schedule. If 1) the AP supports individual and broadcast TWT, 2) all association STAs (STA1/STA2) support individual/broadcast TWT respectively and negotiated the TWT agreements and 3) AP and STA1/STA2 support TWT PS, the AP can announce it to be in TWT PS mode where the AP wake during the TWT SPs 232 and 234, and sleep outside of TWT SPs. In one embodiment, the AP has an SP (not shown in the figure) announced by the AP, e.g. the AP being after the Beacon frame, when the AP is in awake state for STA's association.

Referring next to FIG. 14 multiple options for station (STA) association time periods in an access point will be discussed in accordance with various embodiments of the present disclosure. A period of time within a Beacon Interval is used for STA's association with an AP. The AP is in an awake state or in an active mode during that time, and neither the AP nor the associated STAs can perform normal frame exchanges within the association period 238.

For Association Option 1, the AP is in awake state for an association period 238 that immediately follows the transmission of Beacon 214. The length of the association period 238 can be announced in Beacon 214, announced in another management frame, or be predefined. For Association Option 2, the AP is in awake state for association period 238 that begins at the Target Beacon Transmission Time (TBTT). The length of the association period can be announced in Beacon 214, announced in another management frame, or be predefined.

For Association Option 3, the AP is in awake state for an association period whose start time and end time are announced by the AP (e.g. in the Beacon, another management frame, etc.). For Association Option 4, a target wake time service period (TWT SP) is used for STA association.

Figure 15:
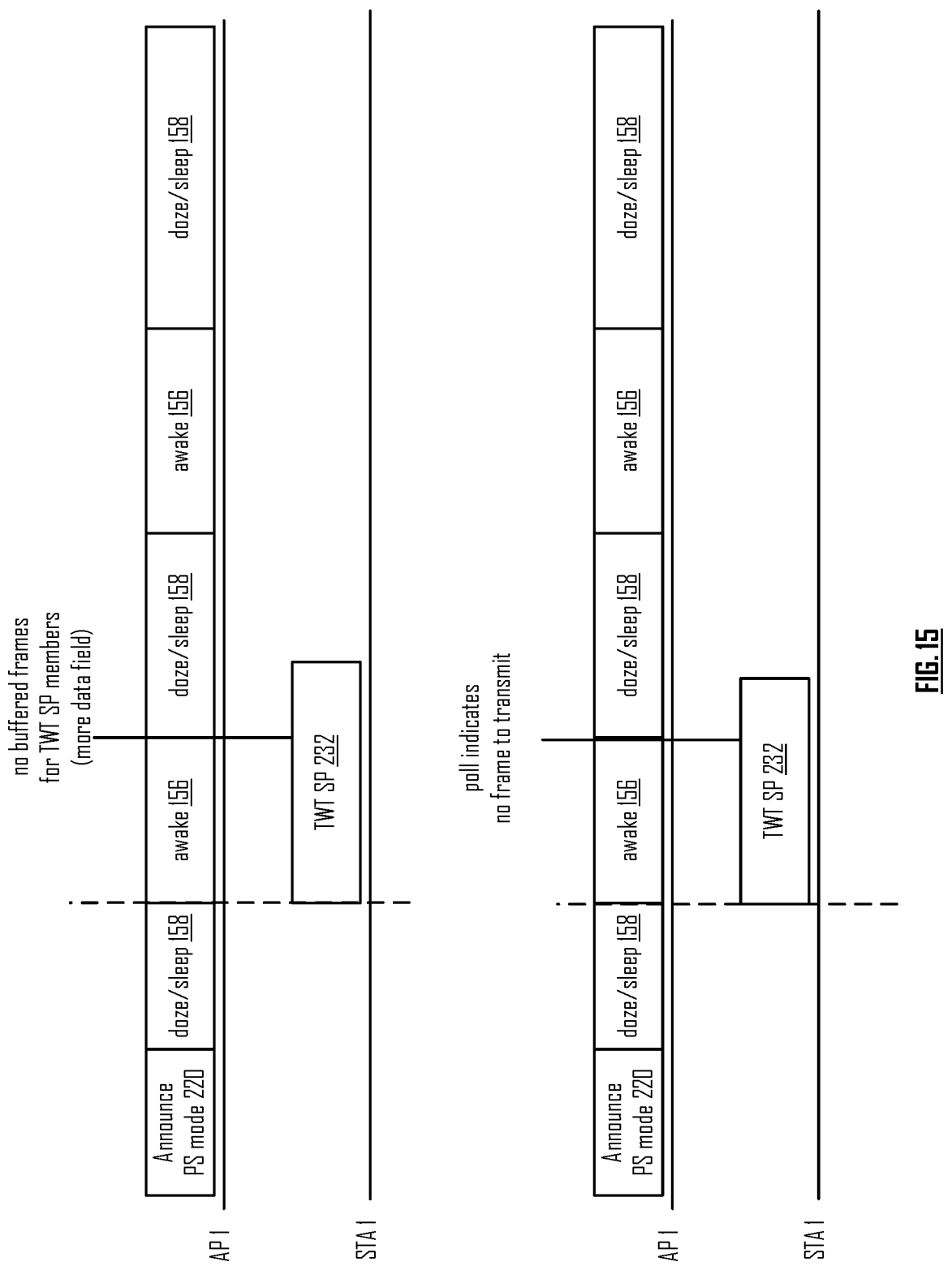
FIG. 15 is a timing diagram illustrating Power Save within a TWT SP according to various embodiments of the present disclosure.

Referring next to FIG. 15 TWT Power Save within a TWT SP will be discussed in accordance with various embodiments of the present disclosure. Power save within a TWT SP allows an AP to enter a doze state before the end of a TWT SP in response to the occurrence of one or more events. For example, The AP can also enter the doze state ahead of the end time of a TWT SP if the following are true: 1), the AP determines that none of the members of the TWT SP have frames to transmit, and 2), the AP has no buffered frames for member devices participating in the TWT SP. The determination of no buffered frames at a member of the TWT SP can be made by one of the following: 1), the buffer status report of the member solicited by AP's buffer status report poll (BSRP) trigger frame indicates no buffered frame at the member, 2) The More Data field in an UL Data, Management frame and BA from the member to an AP in power save mode indicates no buffered frames at the STA. In one embodiment, More Data field in MAC header can be used by a STA to notify whether it has buffered frame(s) for the AP in TWT power save mode. When the STA has no more buffered frame for the AP in TWT power save mode after transmitting a frame to the AP, the More Data field in the frame transmitted by the STA is set to 0. When the STA has more buffered frame for the AP in TWT power save mode after transmitting a frame to the AP, the More Data field in the frame transmitted by the STA is set to 1.

Figure 16:
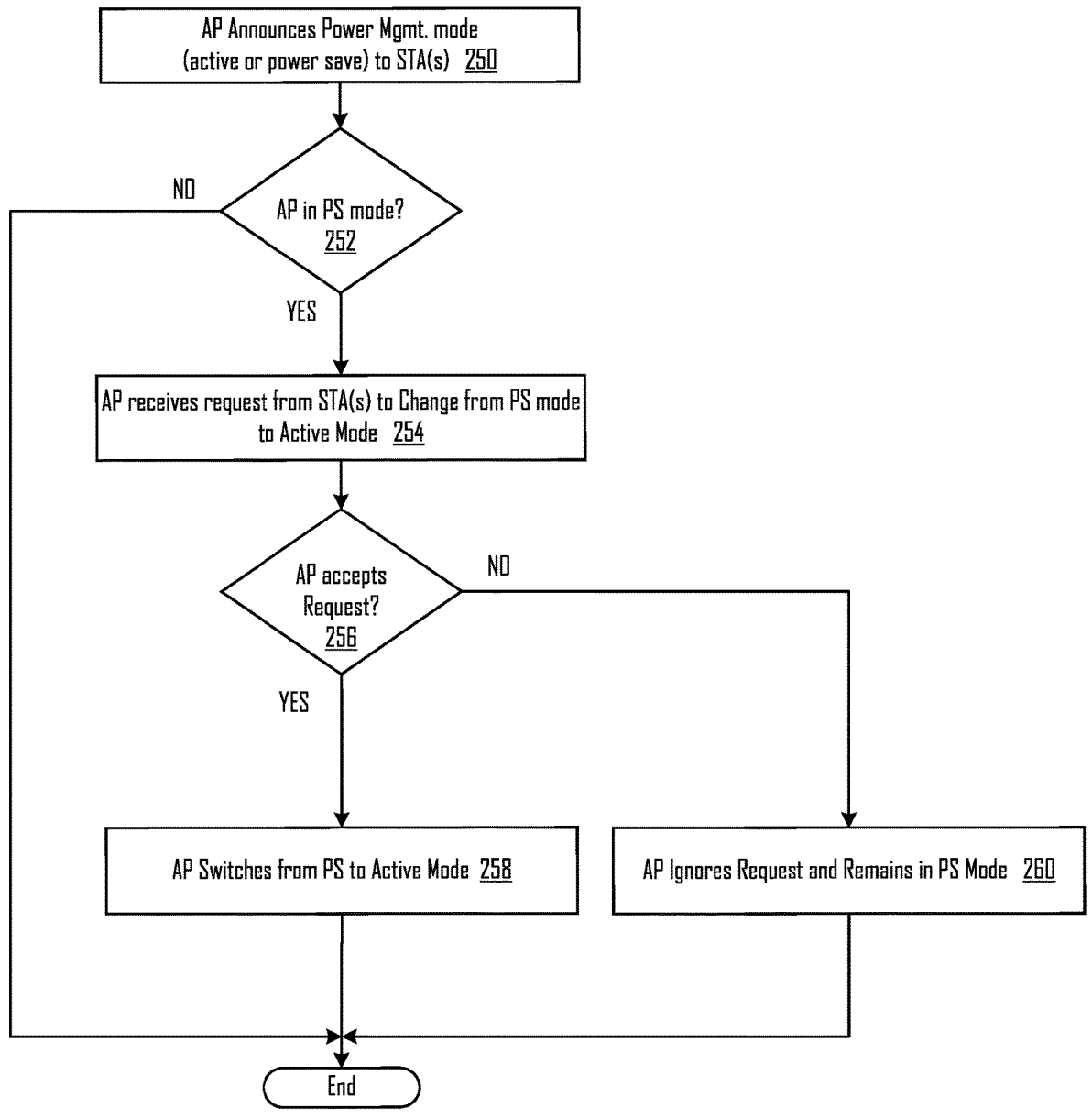
FIG. 16 is a flow chart illustrating a method of handling PS mode changes in an AP power save mode without TWT according to various embodiments of the present disclosure.

Referring next to New FIG. 16, a method in which an AP handles requests to change modes will be discussed in accordance with various embodiments of the present disclosure. In various embodiments described herein, an AP can switch between Power Save mode and Active mode in response to a request from an STA.

As illustrated by block 250, an AP Announces its power management mode. In at least one embodiment, the announcement can indicate that the AP is in either active mode or power save mode. In some embodiments, the AP can announce its power management mode in response to a state request transmitted by an STA.

As illustrated by block 252, if the AP is not in PS mode, there is no need for the STA to request the AP to change to active mode—because it is already there. If, however, the AP is in PS mode, the method proceeds to block 254, where the AP receives a request from an STA to change from PS mode to active mode.

As illustrated by block 256 the AP can, in various embodiments, accept or reject the STA's mode change request. For example, the STA's mode change request can be sent in a management frame of a first TXOP, and the AP's acceptance or rejection of the request can be sent during a subsequent TXOP. In other embodiments, for example where an STA sends a state request to the AP during a specific SP, if the request is received by the AP, the AP will change to an awake state. In that case the AP does not have the opportunity to reject the request, and will not send a responding frame in a subsequent TXOP.

As illustrated by block 258, if the AP accepts the mode change request, the AP Switches from PS to Active Mode. However, as illustrated by block 260 if the AP does not accept the request the AP remains in PS Mode. In one embodiment, such procedure can be applied to AP power save with TWT. In another embodiment, such procedure can be applied to AP power save without TWT Referring next to FIG. 17 an AP power save mode without TWT will be discussed in accordance with various embodiments of the present disclosure. An AP can switch between Power Save mode and Active mode. When in Power Save mode, the AP is in either in awake state or doze state. In active mode, the AP performs medium detection, and is always ready to receive frames and transmit frames. In the awake state of power save mode the AP performs medium detection, and is ready to receive frames and transmit frames. In the doze power save state the AP does not perform medium detection, and does not perform Clear Channel Assessment (CCA).

As illustrated by block 262, a basic service set (BSS) Operation Element receives an announcement indicating an AP's power management mode, e.g. Active mode or PS mode.

As illustrated by block 264 the element other than the BSS Operation Element or the BSS Operation element makes an announcement indicating a Future TBTT (or TSF time) when the AP will switch modes.

As illustrated by block 266, the STA waits for the AP to switch modes. For example, the announcements received by a STA in the BSS to which the AP belongs may have received notifications that the AP will switch from PS mode to Active mode in the $3^{rd}$ upcoming beacon interval, or the STA can wait for a particular time indicated by a TSF time. In any case, the station can wait for the AP to wake.

As illustrated by block 270, at the TBTT or TSF time announced the AP, the STA records the AP's new power management mode and act accordingly, i.e. buffering the frames for the AP until the AP is in awake state if the AP is in power save mode, transmitting the frames to the AP without buffering them if the AP is in active mode. In one embodiment, such power management mode switch procedure is applied to AP power save with TWT.

Referring next to FIG. 18, additional features of an AP power save mode without TWT will be discussed in accordance with various embodiments of the present disclosure. As illustrated by block 272, an STA receives an announcement (unicast frame or broadcast frame) from an AP indicating a future time when AP will perform mode/state switch.

As illustrated by block 274, the STA determines whether the announcement includes information indicating a number of beacon intervals. As illustrated by block 276, if the announcement designates a number of beacon intervals until the future Time when the AP will switch modes, the STA determines the future TBTT when AP will perform mode switch based on the number of beacon intervals specified in the announcement.

As illustrated by block 278, if the announcement uses the TSF time to specify the future Time when the AP will switch modes/states, the STA determines the future TSF time when AP will perform mode/state switch based on the TSF time.

In any or all of the embodiments disclosed herein, The mode change request can include a reason for the request, for example a large buffer size, large delay, or the like. In various embodiments the AP is free to ignore the mode request.

In an example of operation, a decision is made regarding whether to negotiate target beacon transmission times (TBTTs) with individual STAs, as illustrated by block 250. As illustrated by block 251, if TBTTs are to be negotiated, the AP negotiates with the individual STAs to determine TBTTs. Negotiations can be performed in a manner similar to the manner in which target wake times (TWTs) are negotiated. In one embodiment, such power management mode switch procedure is applied to AP power save with TWT.

Figure 19:
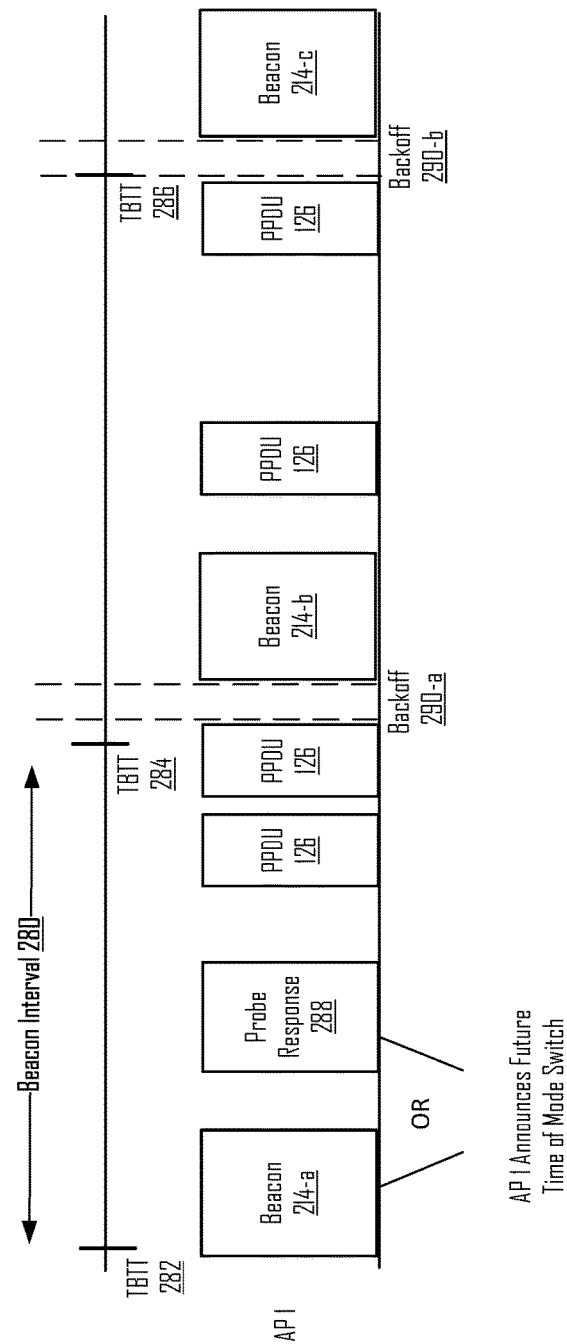
FIG. 19 is a timing diagram illustrating additional features of an AP power save mode without TWT according to various embodiments of the present disclosure.

Referring next to FIG. 19 an AP power save mode without TWT is discussed in accordance with various embodiments of the present disclosure. FIG. 19 further illustrates aspects of the AP power save mode without TWT that has been previously discussed. For example, the announcement of the future time at which the AP intends to switch from a power saving mode to an active mode can be included in beacon 214-*a* or probe response 288, both of which occur during a beacon interval 280, which begins at TBTT 282.

Note that the AP does not necessarily transmit its beacon at exactly the beginning of a TBTT. For example, transmission of Beacon 214-*b* must be delayed until the backoff 290-*a*, and Beacon 214-C must be delayed until the end of backoff 290-*b*.

In one embodiment, an AP in Power Save mode switches from doze state to awake state when transmitting its Beacon, and remains in awake state if the AP needs to transmit buffered frames to the first group of STAs that are operating in power save mode or the AP receives the awake request from its second group of associated STAs that the STAs have buffered frames for it where the first group of STAs and the second group of STAs can be the same STAs or the different STAs. In one embodiment, the AP switch back to doze state after it transmits all its buffered frames for the first group of STAs and the second group of STAs transmit their buffered frames for the AP. Also, an AP in power save mode switches from doze state to an awake state at the beginning of the period for unassociated STAs and associated STAs to transmit frames to the AP, and switch back to doze state at the end of the period.

In one embodiment, in the SP announced by the AP a STA with the buffered frames for the AP in power save mode sends the awake request to the AP in power save mode to request the AP to be in awake state, so that the STA can transmit its buffered frames to the AP.

Figure 20:
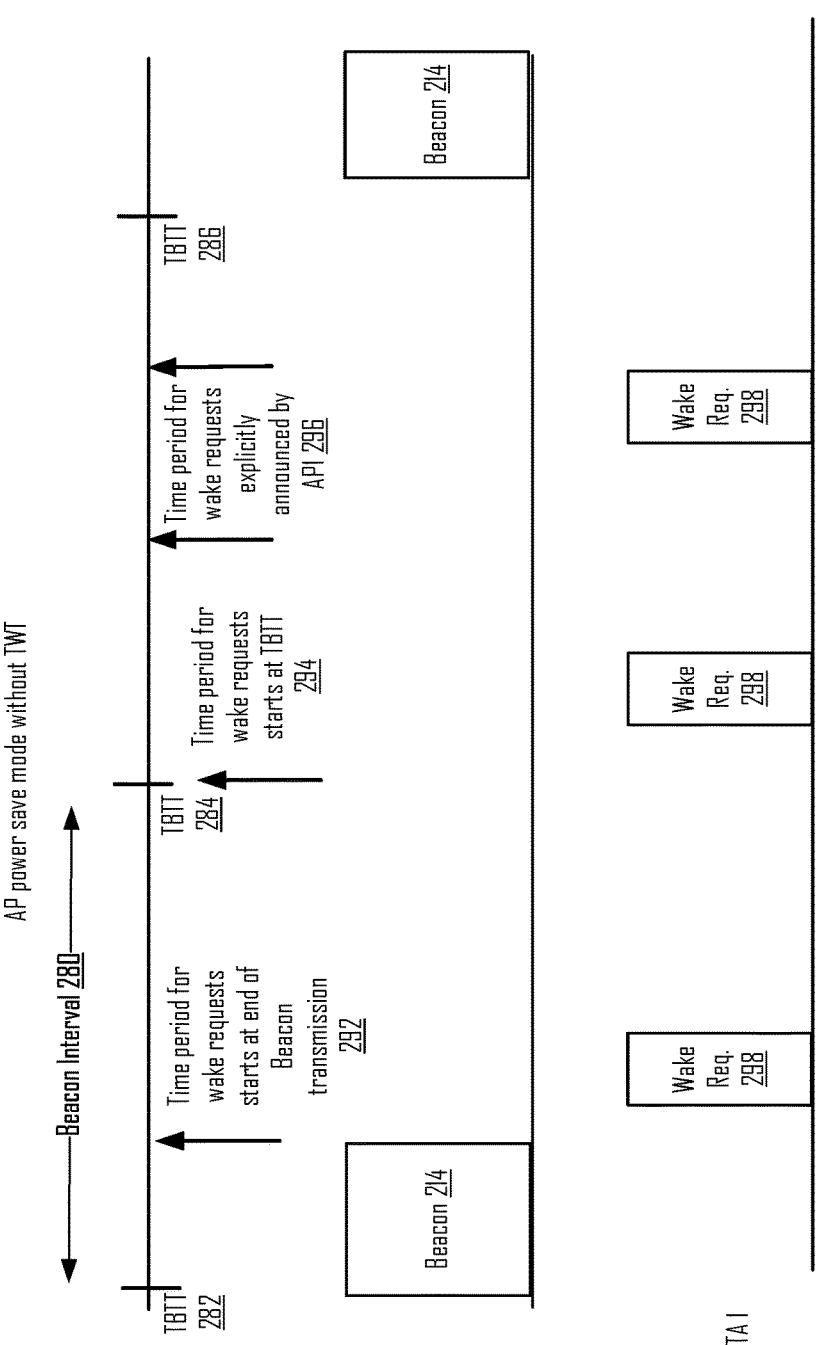
FIG. 20 is another timing diagram illustrating an AP power save mode without TWT according to various embodiments of the present disclosure.

Referring next to FIG. 20 additional aspects of an AP power save mode without TWT will be discussed in accordance with various embodiments of the present disclosure. There are at least three options available to notify STAs of time periods available for sending wake requests 298. In option 1, the start time and end time of the periods during which the STAs can send wake requests 298 are announced explicitly by the AP, as illustrated by time period 296.

In option 2, time periods available for sending wake requests start at the TBTT, as indicated by the beginning of time period 294. In option 3 time periods available for sending wake requests start after the Beacon's transmission, as illustrated by time period 292. In some embodiments, the same time periods for sending wake requests can be used by both associated and unassociated STAs. In other embodiments, associated STAs and unassociated STAs use different time periods for sending wake requests.

Additionally, in some embodiments, the time periods available for sending wake requests can be used for normal frame exchange between an associated STA and the AP. In alternative embodiments neither AP nor the associated STAs can do the normal frame exchanges within the period of the time for awake request transmission.

Figure 21:
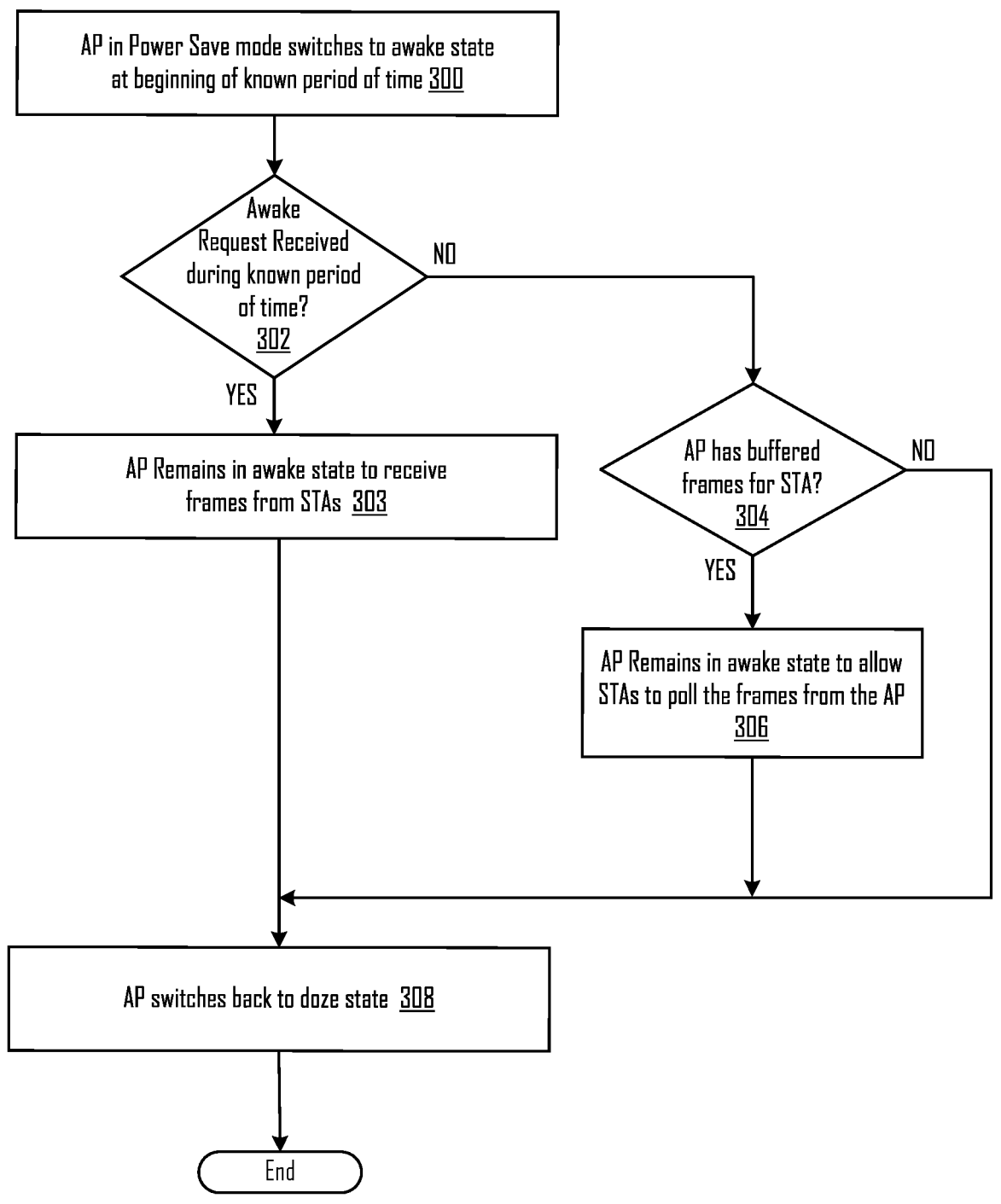
FIG. 21 is another flow chart illustrating the time period for requesting an AP to awake in an AP power save mode without TWT according to various embodiments of the present disclosure.

Referring next to FIG. 21, the time period for requesting an AP to awake will be discussed in accordance with various embodiments of the present disclosure. In embodiments described herein, a period of time within a Beacon interval is used for associated STAs to request AP's awake. This period of time is known by both AP and associated STAs. At the beginning of the period of the time, the AP in power save mode switches to awake state. If a request from an STA is received during this known period of time, the AP will be in an awake state in order to receive frames from the STAs. If the AP has buffered frames for associated STAs that are indicated through a beacon, the AP will be in awake state in order for STAs to poll the frames from the AP. If there is no awake request is received by the AP during the period of the time and there is no buffered frame at the AP, the AP will switch back to doze state at the end of the period of the time until the next TBTT that the AP need to transmit its Beacon or the period of the time for receiving the awake request.

As illustrated by block 300, the method begins by an AP in Power Save mode switching to an awake state at the beginning of a known period of time. As illustrated by block 302, The AP determines whether an awake request is received during the known period. As illustrated by block 303, if an awake request is received from one or more STA(s) during the known period of time, the AP remains in the awake state to receive the frames from the STA(s). After AP has received the frames from the STA(s), the AP switches back to the doze state, as illustrated by block 308.

As illustrated by block 304, if no awake request is received, the AP determines if it has any buffered frames to transmit to one or more STAs. If the determination at block 304 indicates that the AP does have buffered frames to transmit, the AP remains in the awake state to allow STA(s) to poll the buffered frames from the AP, as illustrated by block 306. If, however, the determination at block 304 indicates that the AP does not have any buffered frames, the AP switches back to the doze state.

In one embodiment, the association is done in a period of time announced by the AP that is similar to the period for STA's request for AP's awake. In one embodiment, the SP for association and the period of the time for STA's request for AP's awake are in the same period of time. In one embodiment, the SP for association and the period of the time for STA's request for AP's awake are in different periods of time.

Referring next for STA's request for AP's awake to FIGS. 22A-22F, various options regarding use of the time period for requesting an AP to wake and/or association are discussed.

Each of the methods illustrated in FIGS. 22A-22F begin with the AP the STA both being aware of an agreed time period when the AP will be in active mode or awake state for STA association, as illustrated by block 310. In any of the illustrated embodiments, the length of the association period can be announced or predefined. Furthermore, the period of time for associated STAs to send wake requests and the period of time for non-associated STAs to send wake requests can be same or different.

In FIG. 22A a first set of options is discussed. As illustrated by block 312, the AP is in active mode or awake state immediately after beacon transmission during the period of time used for STA association. The AP can enter the active mode or awake state, or remain in active mode or awake state. As illustrated by block 314, frame exchanges for association, frame exchange for requesting AP's awake state request for STA's buffered frame reception, and normal frame exchange for data frames between the STA and the AP can be performed during the period designated for STA association and/or awake for the buffered frame reception from the STAs.

FIG. 22B illustrates a method nearly identical to the method illustrated in FIG. 22A, except that frame exchanges for association, frame exchange for requesting AP's awake state request for STA's buffered frame reception can be done in the period of the time, but neither the AP nor the STAs are permitted to perform normal frame exchanges during period of time used for STA association, as illustrated by block 316.

FIG. 22C illustrates a method that differs from the method illustrated in FIG. 22A in that rather than being in active mode immediately after beacon transmission, the AP is in active mode beginning at TBTT of the period of time used for STA association. As illustrated by block 314, normal frame exchange between the STA and the AP can be performed during the period designated for STA association.

FIG. 22D illustrates a method nearly identical to the method illustrated in FIG. 22C, except that neither the AP nor the STAs are permitted to perform normal frame exchanges during the period of time used for STA association, as illustrated by block 316.

FIG. 22E illustrates a method that differs from the method illustrated in FIG. 22A in that rather than being in active mode immediately after beacon transmission, the AP is in active mode during a time period explicitly announced by the AP. As illustrated by block 314, frame exchanges for association, frame exchange for requesting AP's awake state request for STA's buffered frame reception, and normal frame exchanges for data frames between the STA and the AP can be performed during this explicitly announced period.

FIG. 22F illustrates a method in which the AP is in active mode during a time period explicitly announced by the AP, frame exchanges for association, frame exchange for requesting AP's awake state request for STA's buffered frame reception can be done in the period of the time, but neither the AP nor the STAs are permitted to perform normal frame exchanges during period this time period, as illustrated by block 316.

Figure 23:
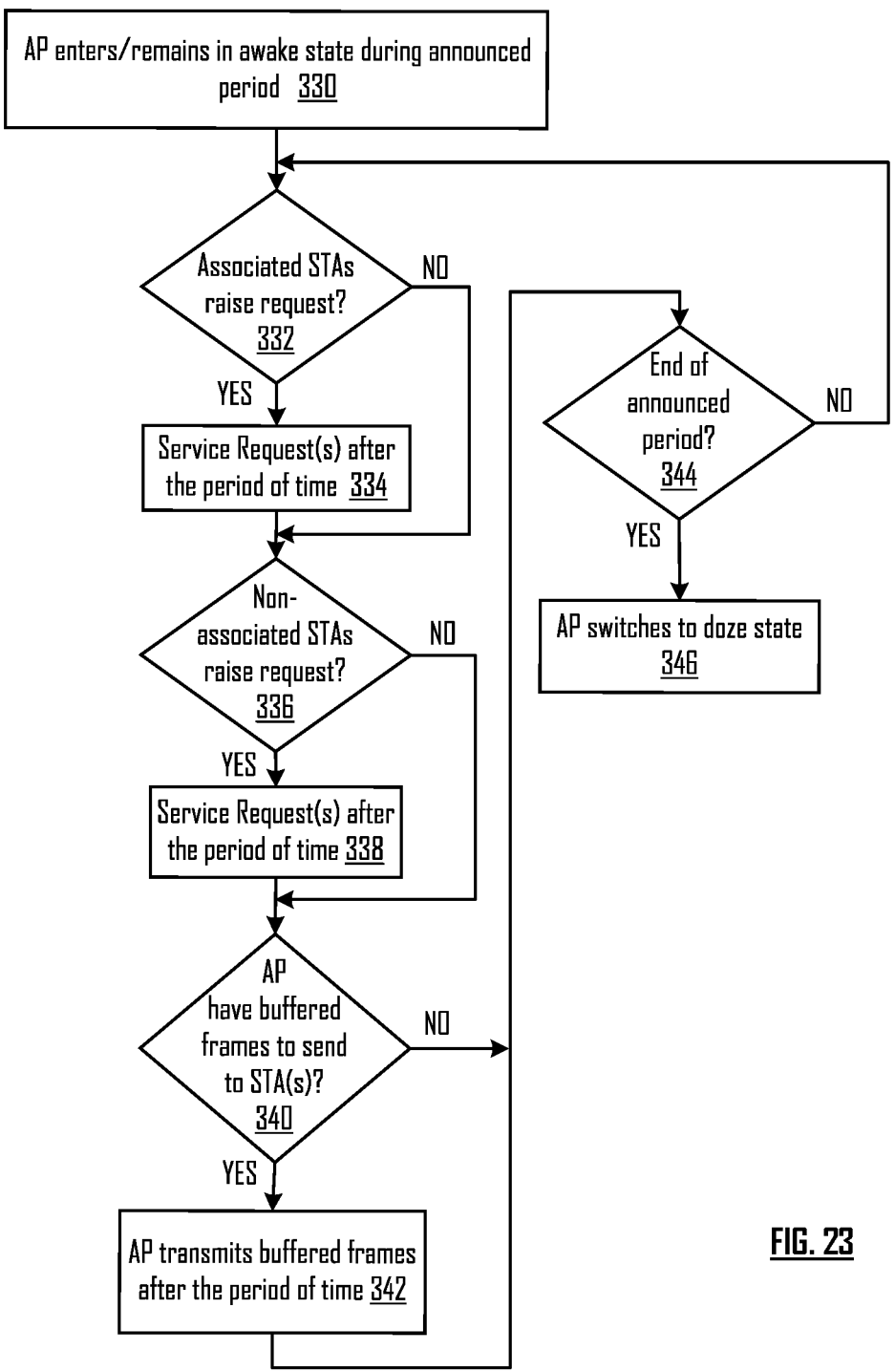
FIG. 23 is another flow chart illustrating other aspects of an AP power save mode without TWT according to various embodiments of the present disclosure.

In one embodiment, the period for associated STA's request for AP's awake can also be used for unassociated STA's request for AP's awake. In one embodiment, the Request is the buffer status carried in one of the HE Control field, and QoS Control field. If at least a request is received by the AP during the period of the time, the AP is in the awake state after the period of the time for the associated STAs to transmit by the buffered frames and for the unassociated STAs to transmit the frames for the association. Referring next to FIG. 23 other aspects of an AP power save mode without TWT, in particular AP switching from Awake to Doze, will be discussed in accordance with various embodiments of the present disclosure In some embodiments, an AP switches from awake doze at the end of an announced period when the following are true: 1) within the announced period for associated STAs, no associated and no unassociated STAs raise a request; or 2) the buffered frames at the AP are all transmitted correctly or discarded (because of frame life time etc.). The AP can announce a single period for both associated and non-associated STAs to request transmission of buffered frames, or announce separate periods for each.

As illustrated by block 330, an AP will enter or remain in an awake state during an announced period for (non)associated STAs to request transfer of buffered frames. In various embodiments, if a traffic indication map (TIM) element of an AP indicates that the AP has buffered frame for transmission to an STA, the AP is in an awake state after the period of the time.

As illustrated by block 332, a determination is made regarding whether an associated STA has raised a request to exchange frames with the AP. If a request is received from an associated STA, the AP is in the awake state to service the request after the period of the time as indicated by block 334.

If, however the there are no requests received from associated STAs, the method proceeds to block 336, where a determination is made regarding whether a non-associated STA has raised a request to exchange frames with the AP.

If a request to exchange frames with the AP is received from a non-associated STA, the AP is in the awake state to service the request after the period of the time as indicated by block 338, otherwise the method proceeds to block 340, where the AP determines if it has any buffered frames to transmit to associated or non-associated STAs.

As illustrated by block 342, if the AP determines that it has buffered frames to transmit to an STA, it is in the awake state to transmit its buffered frames to the STAs after the period of the time. If the AP determines at block 340 that it has no buffered frames to transmit to an STA, the AP checks to see if the announced period has ended, as illustrated by block 344. As illustrated by block 346, at the end of the announcement period the AP switches to the doze state.

As further illustrated by block 344, if the announced period has not ended, the method returns to block 332, and continues to check for STA requests until the announced period has completed.

Figures 24, 25:
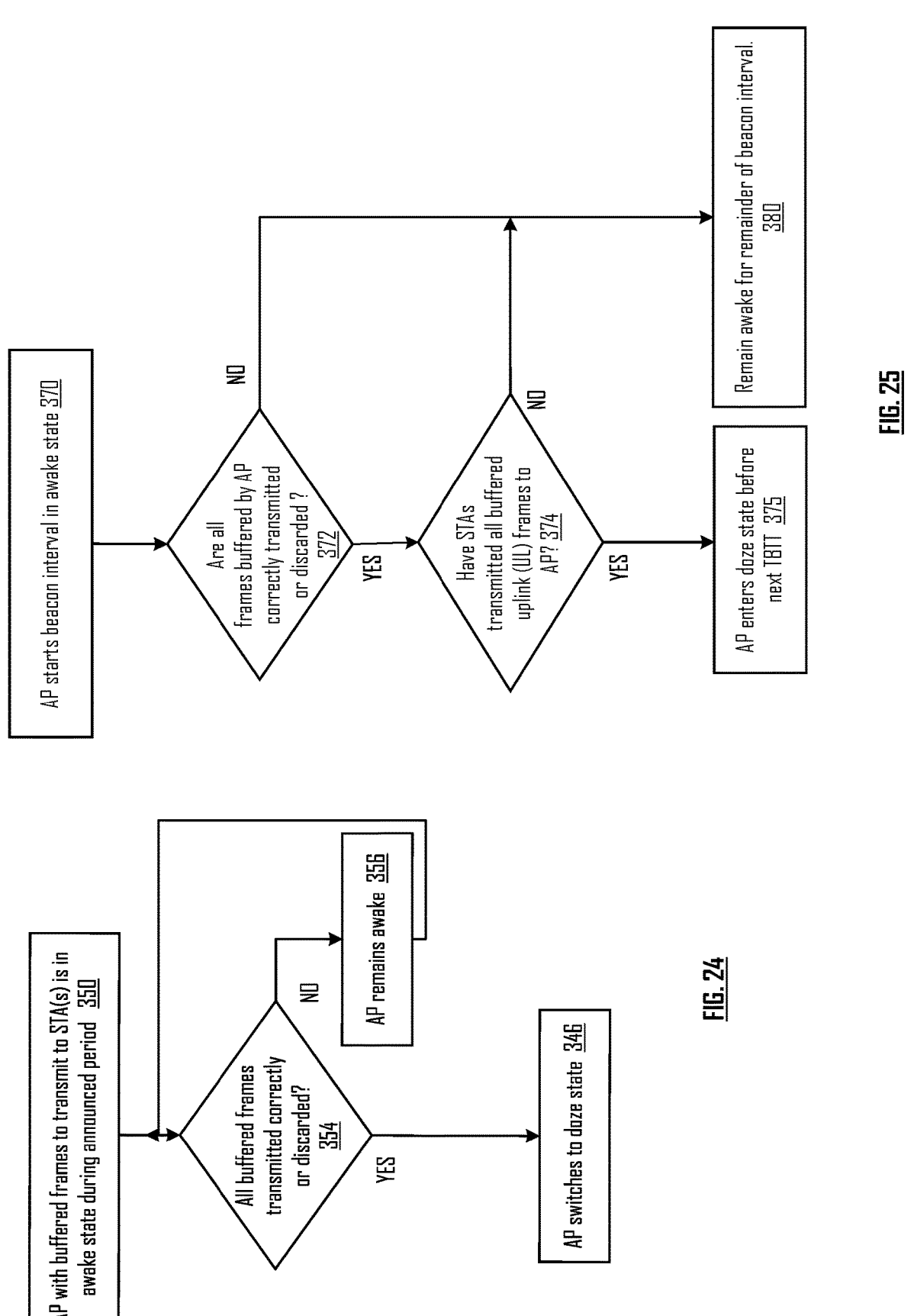
FIG. 24 is another flow chart illustrating yet further aspects of an AP power save mode without TWT according to various embodiments of the present disclosure.
FIG. 25 is another flow chart illustrating yet further aspects of an AP power save mode without TWT according to various embodiments of the present disclosure.

Referring next to FIG. 24 additional aspects of an AP power save mode without TWT will be discussed in accordance with various embodiments of the present disclosure. In various embodiments, an AP may buffer frames for later transmission to an STA.

As illustrated by block 350, An AP with buffered frames that notifies its buffered frames for the STAs through TIM in its Beacon is awake after the announced period.

As illustrated by block 354, the AP determines whether all buffered frames have been transmitted correctly or discarded. If so, the AP switches to the doze state. If, however, there are buffered frames remaining to be transmitted, the AP remains awake, as illustrated by block 356.

Referring next to FIG. 25, additional aspects of an AP power save mode without TWT will be discussed in accordance with various embodiments of the present disclosure. An AP needs to buffer DL frames for later transmission to an STA during periods of time when the STA is in a power save mode. Likewise, an STA can buffer UL frames for later transmission to an AP during periods of time the AP is in a power save mode. In some embodiments, an AP that is currently awake switches back to a doze state when the following are true: 1) the buffered frames at the AP are all transmitted correctly or discarded (because of frame life time, etc.), in which case the TIM element indicates no buffered frames for any STA; or 2) all the STAs that have buffered uplink (UL) frames have transmitted those UL frames to the AP.

The second condition depends on the AP being able to determine that the STAs have UL frames to transmit, and further depends on determining whether those UL frames have been transmitted. If the AP is unable to determine whether all STAs that have buffered UL frames, and whether those frames have been transmitted, the AP will be in the awake state throughout the beacon interval.

As illustrated by block 370, an AP starts a beacon interval (BI) in an awake state. As illustrated by block 372, the AP determines whether all frames buffered at the AP have been correctly transmitted or discarded. If the AP has not correctly transmitted or discarded all buffered frames to an STA the AP will transmit the Beacon with TIM to announce the buffered frames for STAs and remain awake for the remainder of the BI for delivering the buffered frames for STAs, as illustrated by block 380.

Otherwise, the AP will attempt to determine if the STAs have buffered frames to transmit to the AP. If the AP determines that the STAs have buffered uplink (UL) frames to transmit, the AP remains awake for the remainder of the beacon interval for receiving the STA's buffered frames, as illustrated by block 380. In some embodiments, the AP may not be able to determine if the STAs have buffered uplink (UL) frames to transmit to the AP because the AP has not received the frame that carries the request from an STA, or because one or more frames from the STAs lack the information necessary to make the determination. Conversely, information contained in one or more frames received by the AP from one or more STAs may allow the AP to determine whether an STA has buffered uplink (UL) frames to transmit to the AP.

If the AP determines that one or more STAs have buffered uplink (UL) frames to transmit, the method proceeds to block 380.

As illustrated by block 380, the AP transmits its buffered frames, if exist, to the STAs and receives the buffered frame from the STAs, if exist. At block 374, a determination is made regarding whether the STAs have transmitted all of their buffered uplink (UL) frames to the AP. In at least one embodiment, the AP can make this determination based on the More Data field in an UL Data, Management frame or Control frame (Ack, BA for example) transmitted by the STA to the AP in power save mode. The More Data field indicates whether there are other buffered frames at the STA. If the AP determines that the STAs have transmitted all of their buffered UL data frames to the AP, or if the AP determines that the STAs do not have any buffered UL data frames to transmit, the AP can enter a doze state before the next TBTT, as illustrated by block 375. If the STAs have more buffered UL frames to transmit, the AP remains awake for the remainder of the beacon interval until the next TBTT.

Referring next to FIGS. 26-34, various implementation of MLD power management are illustrated and discussed. In various embodiments, each AP announces its power management mode through its own Beacon. If the AP and the other APs are affiliated with the same AP MLD, each AP can announce the power save mode of the other APs. When at least one AP in the link that a traffic identifier (TID) of a non-AP MLD is mapped is in active mode, the non-AP MLD can transmit the frames of the TID to the AP in active mode. A request of a device that an AP in one link switches to an awake state can be transmitted through another link or in the same link. TIDs link frames to links. In at least one embodiment, the power save mechanism of AP MLD cannot be used in an AP MLD with single affiliated AP, or an AP MLD with all affiliated APs in power save mode.

Figure 26:
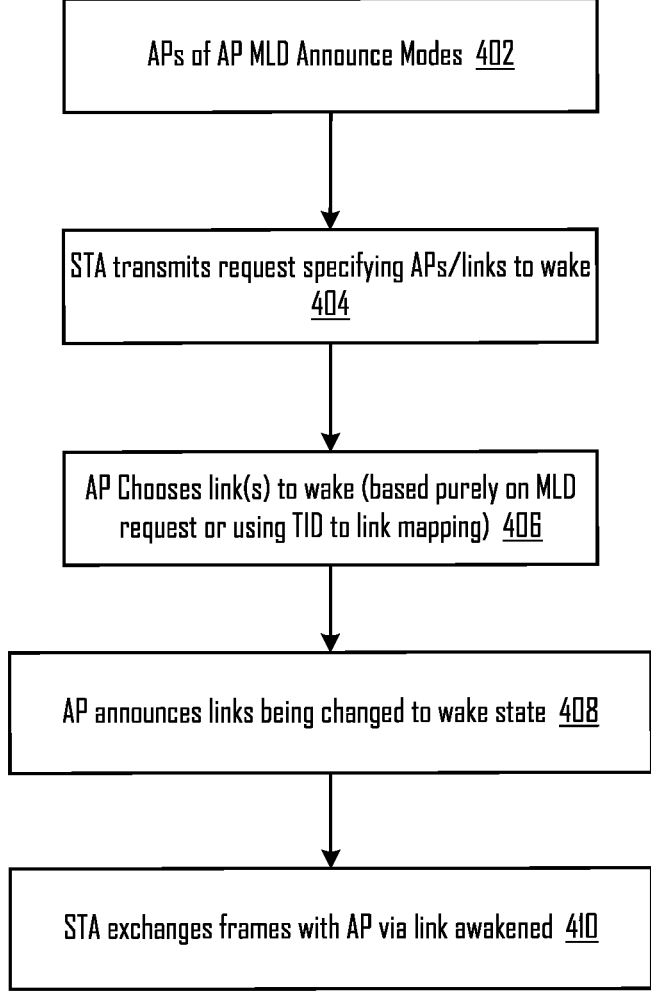
FIG. 26 is a flow chart illustrating an overall method of AP MLD Power Management according to various embodiments of the present disclosure.

Referring now to FIG. 26 a method of AP MLD Power Management will be discussed according to various embodiments of the present disclosure. As illustrated by block 402, the power save mode of an AP affiliated with an AP MLD is announced by the AP and/or the other APs of the AP MLD.

As illustrated by block 404, a non-AP STA, can request an AP in doze state to switch to an awake state through another AP. As discussed subsequently, an STA can request multiple APs and/or links to switch states. As illustrated by block 406, an AP MLD chooses which APs/links to wake. The AP can make that choice based purely on the STAs request, or based on TID to link mapping.

As illustrated by block 408, an AP announces which links are being changed to an awake state. An AP of an AP MLD that intends to change its active mode or power save mode need to announce the change early enough so that an associated STA can be aware of the change. As illustrated by block 410, once the AP wakes, the STA can exchange frames with the AP using the link(s) awakened.

Figure 27:
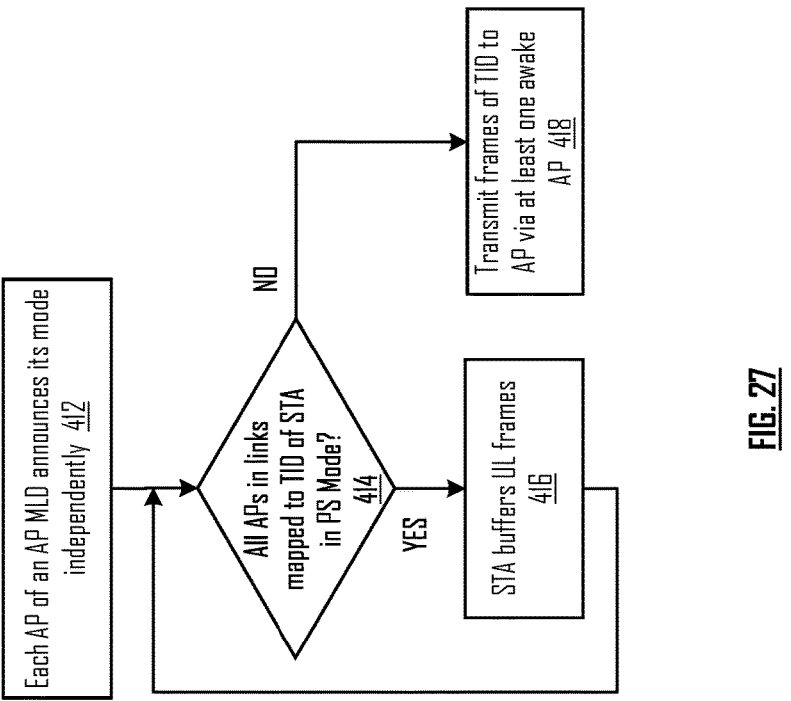
FIG. 27 is a flow chart illustrating additional aspects of AP MLD Power Management according to various embodiments of the present disclosure.

Referring next to FIG. 27 additional aspects of AP MLD Power Management will be discussed according to various embodiments of the present disclosure. As illustrated by block 412 in at least one embodiment each AP of an AP MLD announces its mode independently, meaning that the power management modes of the other affiliated APs are not considered. An AP in power save mode will be in either awake state or doze state. An AP in active mode will be always in awake state. In at least one embodiment, an AP in power save mode that is affiliated with an AP MLD will schedule its beacon transmission at its TBTTs.

As illustrated by blocks 414 and 416, if an STA determines that all APs in links mapped to TID of STA are in PS Mode, the STA will buffer any UL frames mapped to the TID. As illustrated by block 418, in response to at least one of the APs in the links mapped to the TID being awake, the STA can transmit any previously buffered frames. When block 414 indicates that at least one AP in the link to which a TID of a non-AP MLD is mapped is in an active mode, the non-AP MLD can transmit the frames of the TID to the AP in active mode without buffering the frames.

Figure 28:
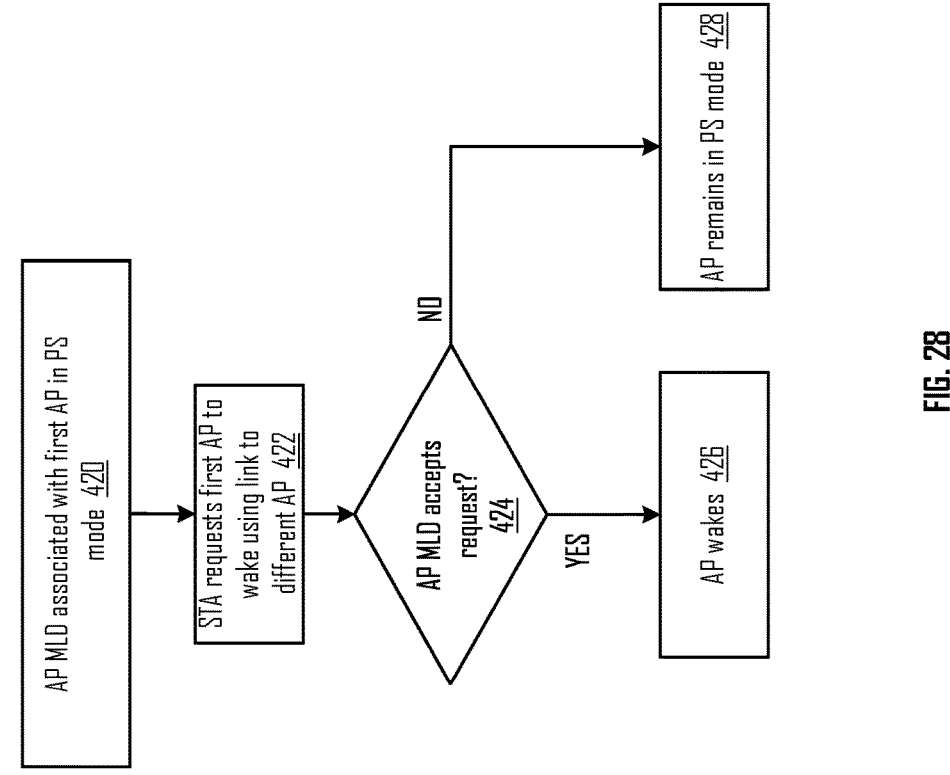
FIG. 28 is a flow chart illustrating further aspects of AP MLD Power Management according to various embodiments of the present disclosure.

Referring next to FIG. 28 further aspects of AP MLD Power Management will be discussed according to various embodiments of the present disclosure. As illustrated by block 420 an AP MLD is associated with a first AP in PS mode.

As illustrated by block 422, a non-AP MLD (e.g. an STA MLD) can request the first AP, which is in power save mode, to switch to active mode. This request for a switch to active mode can be made either through the link that the first AP is working on, another link of the AP, or a link of a second AP. As illustrated by block 424, the AP MLD can accept or reject the request to wake the first AP.

As illustrated by block 426, if the AP MLD accepts the request, the AP switches to an awake or active state. As illustrated by block 428 if the AP MLD rejects the request, the AP remains in its current PS mode. In one embodiment, the AP may announce the time (the time of a future TBTT by indicating the remaining TBTTs, the TSF time) when the mode switch will happen.

Figure 29:
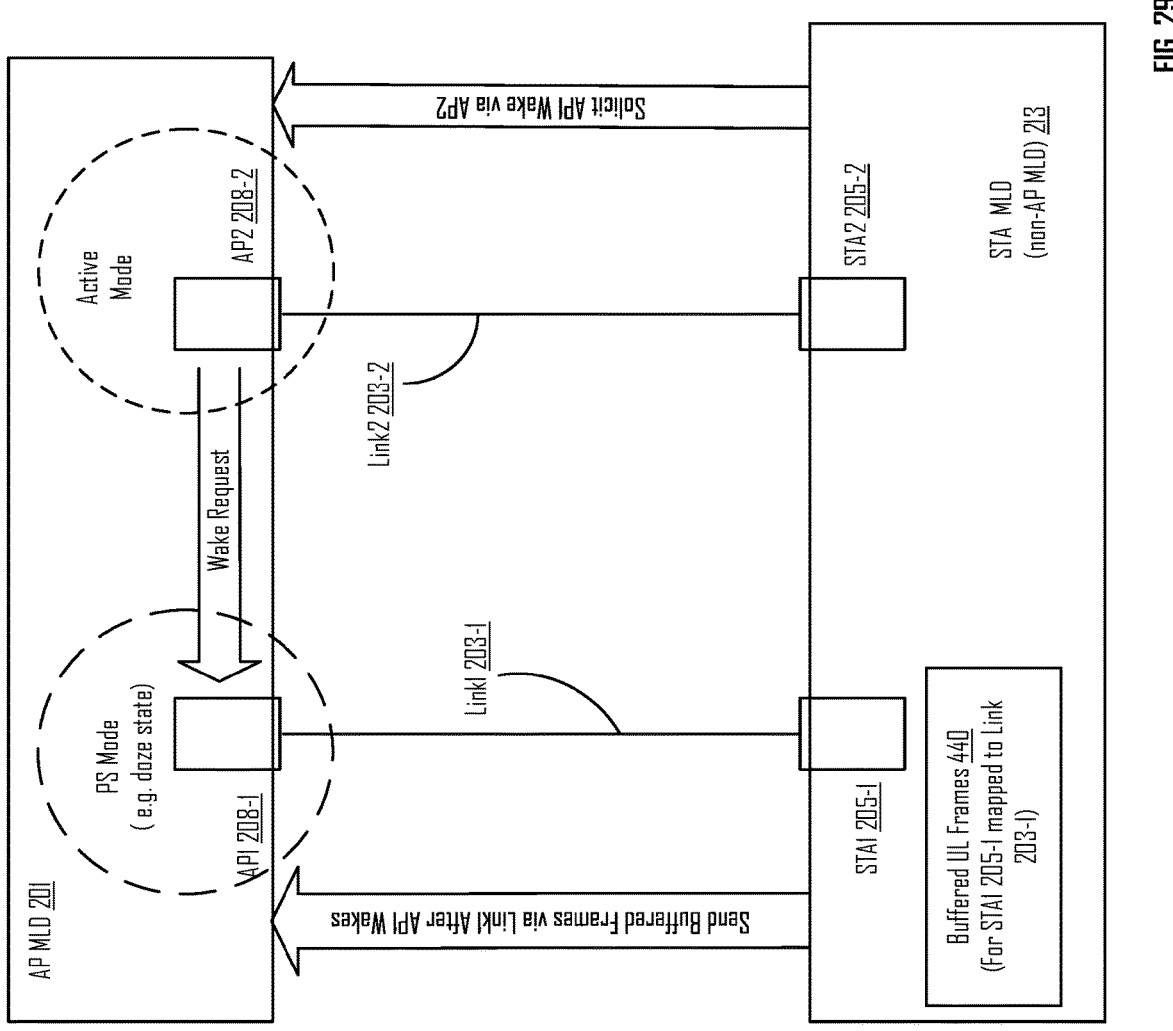
FIG. 29 is a diagram illustrating a STA MLD soliciting an AP to wake via cross-link signaling according to various embodiments of the present disclosure.

FIG. 29 is a diagram illustrating a STA MLD soliciting an AP to wake via cross-link signaling according to various embodiments of the present disclosure. As illustrated, STA MLD 213 has buffered UL frames to send to AP1 208-1 via link1 203-1, but AP1 208-1 is currently in a doze state. STA MLD 213 can solicit AP1 to wake via AP2 208-2 using link2 203-2. This is an example of cross-link signalling (e.g., the request is transmitted in a link to which the buffered UL frames are not mapped).

Figure 30:
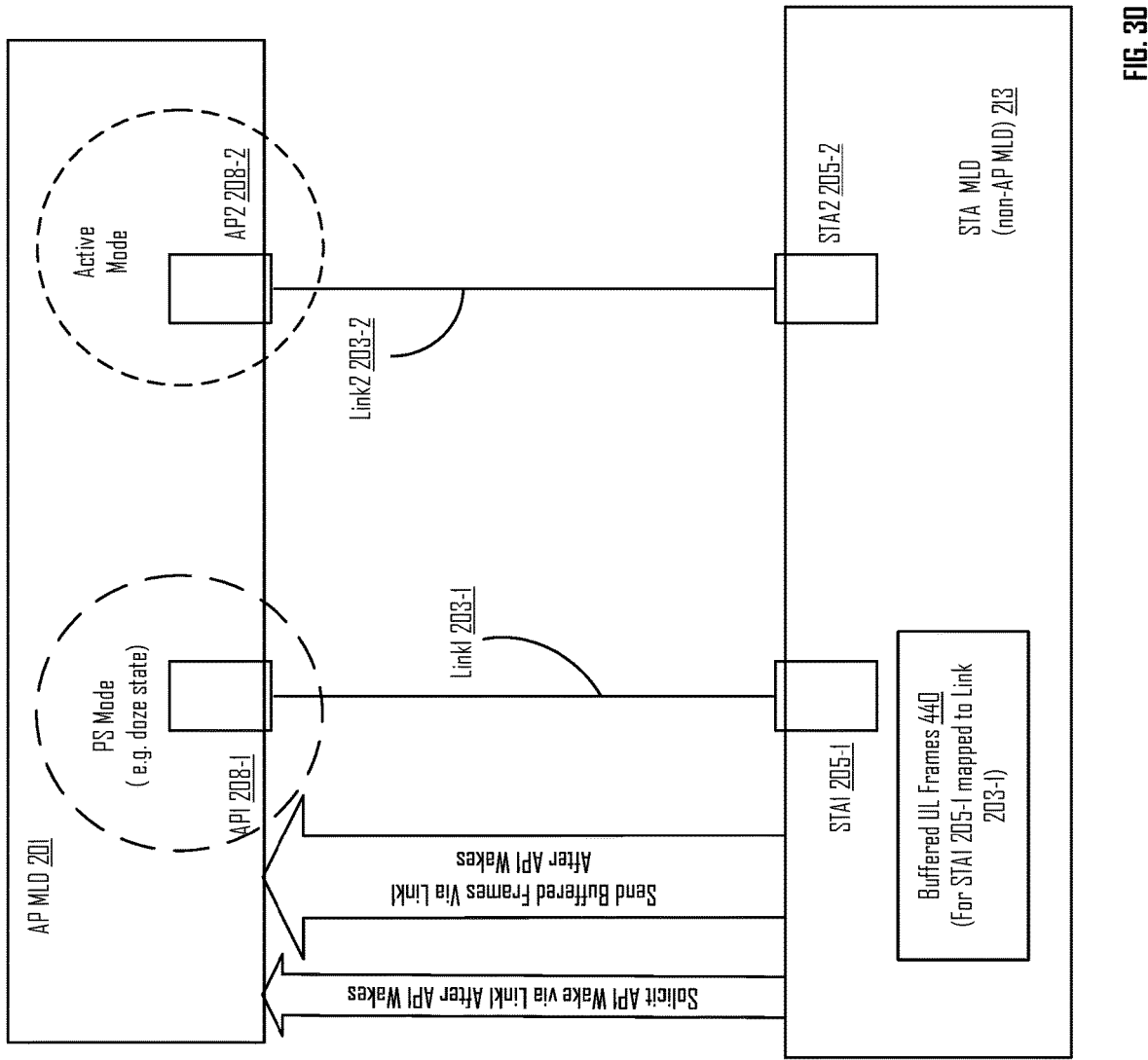
FIG. 30 is a diagram illustrating another technique for an STA MLD to solicit an AP to wake according to various embodiments of the present disclosure.

Referring next to FIG. 30, another technique for an STA MLD to solicit an AP to wake will be discussed according to various embodiments of the present disclosure. In this example, an STA MLD solicits AP1 208-1 to wake via Link1 203-1, which is the preferred link of the STA MLD (e.g. the link where the STA MLD wake up and to which the buffered UL frames at STA MLD are mapped).

There are at least three option for carrying the wake request/solicitation discussed in FIGS. 29 and/or 30. In a first option the request to wake can be carried in a MAC header. A non-AP STA affiliated with a non-AP MLD may transmit a BSR frame (e.g., QoS Null frame with Queue Size info of a TID) on link 1 while the TID is mapped only to link 2 and link 3. In one embodiment, a non-AP MLD sends the request to list the APs being requested to be switched to awake state. In one embodiment, a non-AP MLD sends the request to announce the buffer status for each TID and the AP MLD figures out the requested APs per the non-AP MLD's TID-to-Link mapping, e.g. the AP1 and AP2 of an AP MLD are requested to switch to awake state when the non-AP MLD has buffered frames of TID 5 only and the UL TID 5 is mapped to AP1 and AP2 of the AP MLD. In one embodiment, a non-AP MLD sends the request to announce the buffer status for each TID and notifies the AP MLD one or multiple recommended APs to switch to awake state. If the APs operating in link 2 and link 3 are in doze state and the AP receives the BSR frame on link 1, an AP affiliated with the AP-MLD may wake up on link 2 or link 3 and may transmit a Trigger frame (e.g., Basic Trigger frame) to the non-AP STA affiliated with the non-AP MLD on link 2 or on link 3.

A second option for carrying the request to wake includes carrying the request in a frame body, for example a Control frame, Management frame, or NDP feedback (different tones are allocated to different AIDs)).

A third option for carrying the request to wake includes implicitly indicating the request in MPDU Delimiter of the frame that carries the request. This technique can be used when TB PPDU carries the request and multiple STA MLDs contend one RU for sending the request. In some such embodiments, the AP MLD loses the specific STA's information, but knows that some STA MLDs request the AP's wake in the link if multiple STA MLDs use the same RU.

Figure 31:
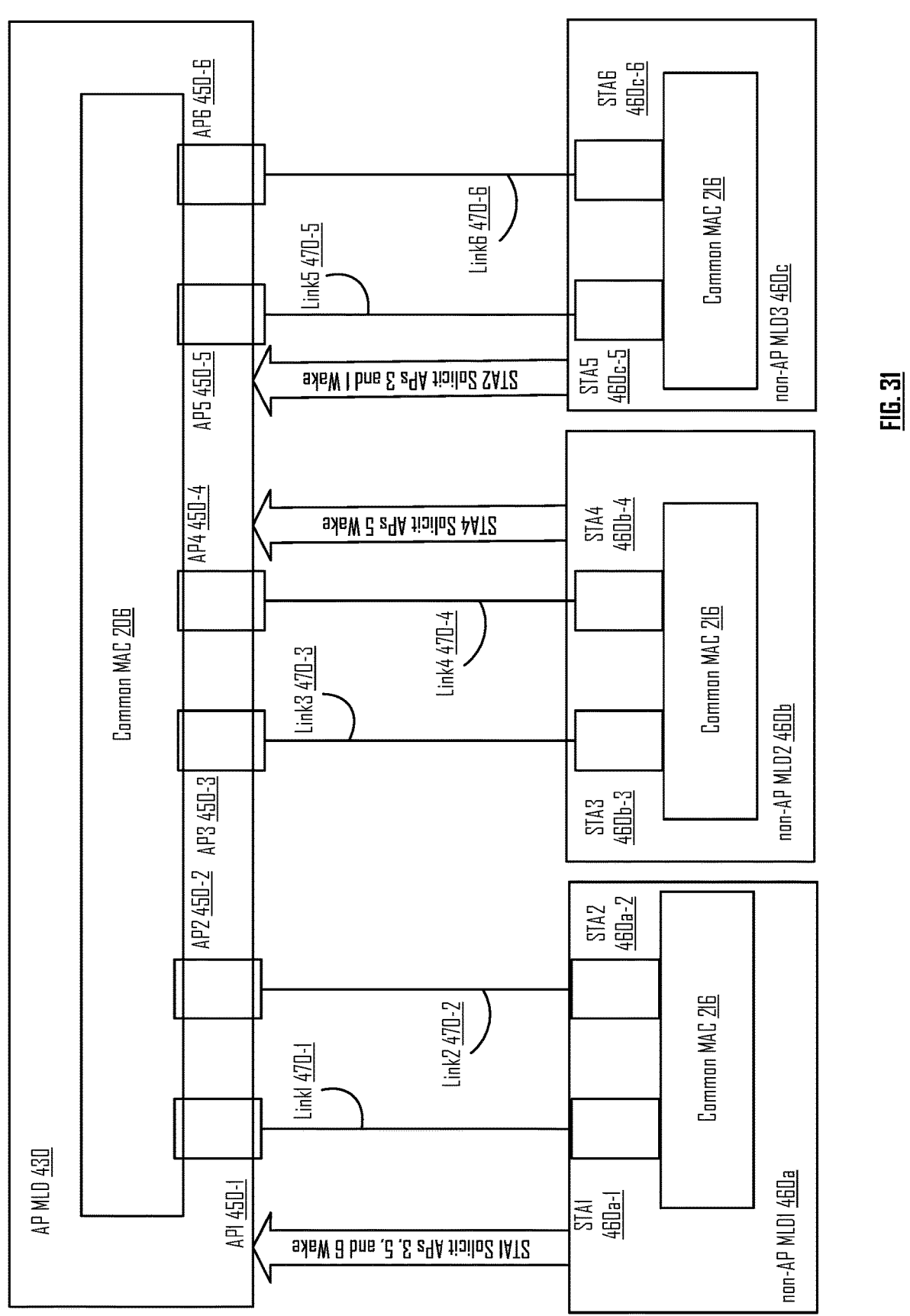
FIG. 31 is diagram illustrating an STA MLD soliciting multiple APs to wake according to various embodiments of the present disclosure.

Referring to FIG. 31 an STA MLD soliciting multiple APs to wake according to various embodiments of the present disclosure. In various embodiments, different non-AP MLDs may solicit different power save APs of the AP MLD for the frame exchanges. In at least one embodiment, to save power, methods are used to provide a higher chance for an AP MLD to wake fewer APs.

FIG. 31 shows AP MLD 450 having six associated APs, namely AP1 450-1, AP2 450-2, AP3 450-3, AP4 450-4, AP5 450-5 and AP6 450-6. There are three non-AP MLDs that each include two STAs. Non-AP MLD1 460a includes STA1 460a-1 and STA2 460a-2. Non-AP MLD2 460b includes STA3 460b-3 and STA4 460b-4. Non-AP MLD3 460c includes STA5 460c-5 and STA6 460c-6 In the illustrated example, non-AP MLD 460a, which is included in a first non-AP MLD2 460a, solicits APs 1 and 2 to wake via Link1 470-1. non-AP MLD 460c, which is included in a second, different, non-AP MLD2 460b, solicits AP 5 to wake via Link2 470-2, while non-AP 460b, solicits AP 3, 4 to wake via Link4 470-4.

In response to each of the wake requests, the AP MLD 450 will choose which APs to wake up. In various embodiments, AP MLD 450 selects the APs to wake based purely on the requests transmitted by STAs MLD 460a-c. In an example of operation, in a link to which a TID is not mapped, an STA MLD sends the awake request to request the APs of the other link(s) to awake for receiving frames of the TID from the STA MLD. In at least one embodiment, the STA MLD should indicate the highest number of APs being allowed by TID to link mapping and its buffered frames. The AP MLD decides which of the APs indicated by the STA MLD that will awake to receive the frames from the STA MLD.

In alternative embodiments, the AP MLD selects the AP(s) to awaken based on the TID to link mapping. An STA MLD send the awake request in a link to which the TID is not mapped. The awake request may carry the request for a single link or multiple links (recommended link(s)). The AP MLD decides which AP(s) that will awake to receive the frames from the STA MLD based on the TID to link mapping. This is at least true for the case that the TID to link mapping between the STA MLD and the AP MLD is a default mapping, and for negotiated TIDs mapped to same set of links.

When multiple APs in power save mode are requested, the AP MLD can select some or all of them to change to awake state. There are multiple options the AP can use to announce which APs have been chosen to be awakened. For example, the announcement can be transmitted in the link where the request is received, or in the link where the AP changes to awake state. The announcement can be transmitted in a unicast frame or a broadcast frame. Finally, the announcement can be made in a MAC header, for example the new defined HE Control field, or in a frame body, for example a control frame or management frame. Various combinations of these options can be employed.

Figure 32:
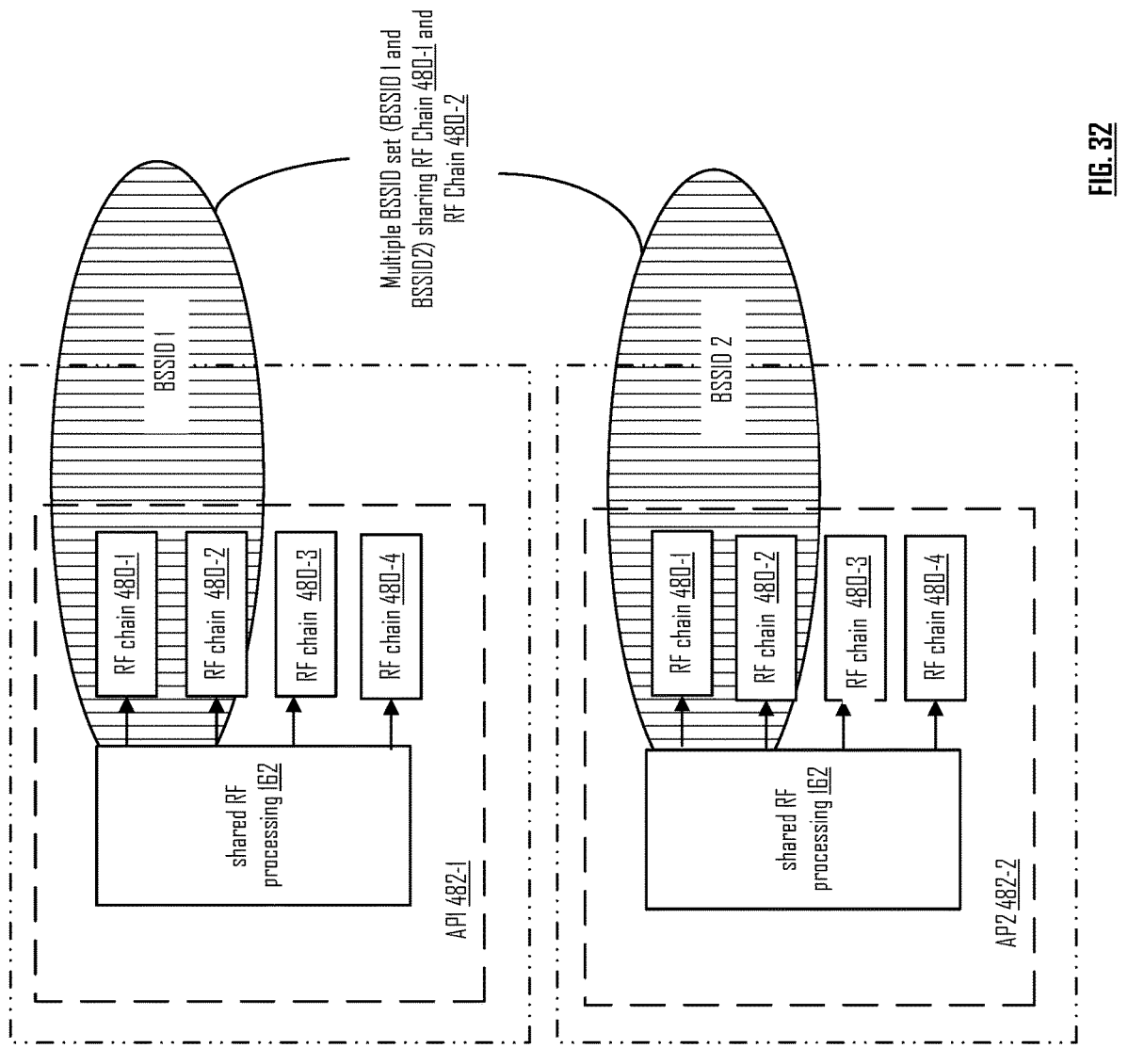
FIG. 32 is diagram illustrating Power Management under multiple BSSID according to various embodiments of the present disclosure.

Referring next to FIG. 32 Power Management under multiple BSSID will be discussed according to various embodiments of the present disclosure. In a device, multiple APs with each AP affiliated with the different AP MLD may share the same RF chains (APs in same multiple BSSID set, co-hosted APs). FIG. 32 illustrates AP1 482-1 and AP2 842-2 that share RF Chain1 480-1 and RF Chain2 480-2.

AP1 482-1 uses RF Chain1 480-1 and RF Chain2 480-2 for BSSID 1, and AP2 842-2 uses RF Chain1 480-1 and RF Chain2 480-2 for BSSID 2. BSSID 1 and BSSID 2 form a multiple BSSID set, in which information for the AP with non-transmitted BSSID is carried in frames of the AP with transmitted BSSID.

Various power management options are available for multiple BSSID operation. In one embodiment, when one AP in a multiple BSSID set enables intra-PPDU power save, another AP in the multiple BSSID set may disable intra-PPDU power save. In another embodiment, when one AP in a multiple BSSID set enables intra-PPDU power save, another AP in the multiple BSSID set needs to enable intra-PPDU power save. In one embodiment, when one AP in a multiple BSSID set enables dynamic SM power save, another AP in the multiple BSSID set may disable dynamic SM power save. In another embodiment, when one AP in a multiple BSSID set enables dynamic SM power save, another AP in the multiple BSSID set needs to enable dynamic SM power save. In a first option, all the APs of the same multiple BSSID set have the same power management mode, meaning that they are either all are in power save mode, or all are in active mode. In a second option, different APs of the same multiple BSSID set can have different power management modes at the same time.

In some embodiments, different APs can have different awake/doze states, even though the APs are operating in the same mode, e.g. power save vs. active. In alternative embodiments, all of the APs of the same multiple BSSID set have the same awake/doze state, meaning that either all are in awake state or all are in doze state) at the same time.

Figure 33:
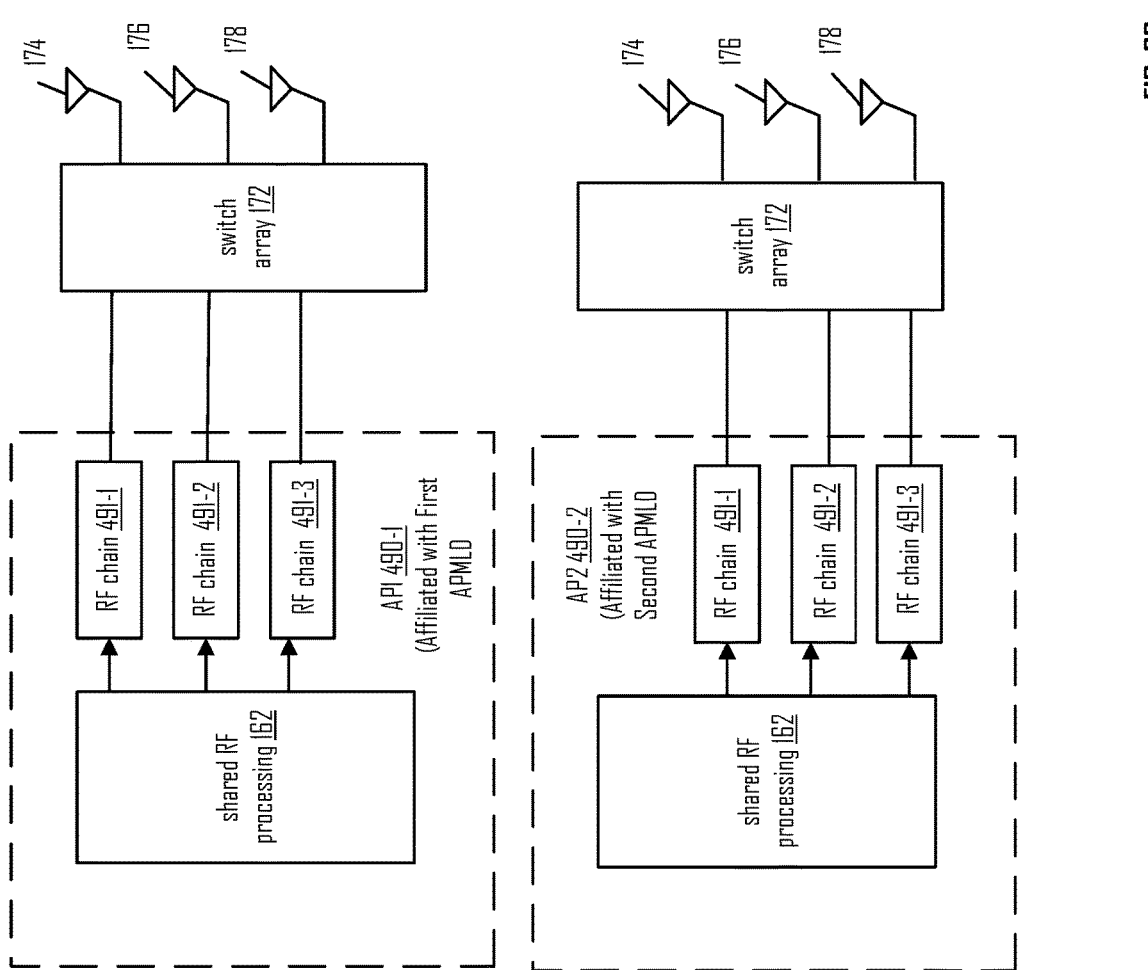
FIG. 33 is a diagram illustrating power management under co-hosted APs according to various embodiments of the present disclosure.

Referring next to FIG. 33 power management under co-hosted APs will be discussed according to various embodiments of the present disclosure. As illustrated, AP1 490-1 and AP2 490-2 are co-located APs and are affiliated with the different AP MLDs, and share RF Chain2 491-2 and RF Chain3 491-3.

Multiple APs affiliated with the different AP MLDs may share the same RF chains (APs in same multiple BSSID set, co-hosted APs). Power save (PS) options for co-hosted APs include the following. In one embodiment, when one AP in a co-hosted AP set enables intra-PPDU power save, another AP in the co-hosted AP set may disable intra-PPDU power save. In another embodiment, when one AP in a co-hosted AP set enables intra-PPDU power save, another AP in the co-hosted AP set needs to enable intra-PPDU power save. In one embodiment, when one AP in a co-hosted AP set enables dynamic SM power save, another AP in the co-hosted AP set may disable dynamic SM power save. In another embodiment, when one AP in a co-hosted AP set enables dynamic SM power save, another AP in the co-hosted AP set needs to enable dynamic SM power save. In a first option, if one of the co-host APs in a device changes its power management mode at its TBTT, and then another co-hosted AP of the same device reaches its TBTT after the time defined by TBTT difference, another co-hosted AP needs to switch to the same power management mode. In a second option, different co-hosted APs can have different power management modes at any time.

Referring next to FIG. 34, AP mode switch time in RNR will be discussed in accordance with various embodiments of the present disclosure. As noted earlier, one AP's TWT power save mode change (from active mode to power save mode or from power save mode to active mode), and the mode after the change, can be announced by another AP's Beacon in the reduced neighbor report (RNR) element), in its own beacon, or in another management frame.

When RNR carries the AP mode switch time, the full critical update of AP1 can be carried in the beacon of AP2, which is affiliated with the same AP MLD as AP1, where AP2 doesn't support multiple BSSID. In such embodiments, the Critical Update Flag in the Capability Information field is set to 1, the Beacon Parameters Change Count in RNR element related to AP1 is increased by 1, and All Updates Included in RNR element related to AP1 are set to 1.

When RNR carries the AP mode switch time, the full critical update of AP1 can be carried in Beacon of AP2, which is affiliated with the same AP MLD as AP1, where AP2 has transmitted BSSID. In such embodiments, The Critical Update Flag in the Capability Information field is set to 1, the Beacon Parameters Change Count in RNR element related to AP1 is increased by 1, and All Updates Included in RNR element related to AP1 are set to 1.

When RNR carries the AP mode switch time, the full critical update of AP1 can be carried in Beacon of AP2, where AP3 and AP2 are in same multiple BSSID set and AP3 and AP1 are affiliated with the same AP MLD. In such embodiments, non-transmitted BSSIDs Critical Update Flag in Capability Information field is set to 1, the Beacon Parameters Change Count in RNR element related to AP1 is increased by 1, and All Updates Included in RNR element related to AP1 are set to 1.

Referring next to FIG. 35, AP Mode Switch Time in Basic Multi-Link Element will be discussed in accordance with various embodiments of the present disclosure. When RNR does not carry the AP mode switch time, there are at least three options for configuring Beacon information.

When the RNR does not carry the AP mode switch time, the Beacon of AP2 affiliated with the same AP MLD as AP1 where AP2 doesn't support multiple BSSID has the following information: the Critical Update Flag in Capability Information field is set to 1; the Beacon Parameters Change Count in RNR element related to AP1 is increased by 1; and All Updates Included in in RNR element related to AP1 is set to 0.

When RNR does not carry the AP mode switch time, the Beacon of AP2, which is affiliated with the same AP MLD as AP1 where AP2 has transmitted BSSID has the following information: Critical Update Flag in Capability Information field is set to 1; the Beacon Parameters Change Count in RNR element related to AP1 is increased by 1; and All Updates Included in in RNR element related to AP1 is set to 0.

When RNR does not carry the AP mode switch time, the Beacon of AP2 where AP3 and AP2 are in same multiple BSSID set and AP3 and AP1 are affiliated with the same AP MLD has the following information: Non-transmitted BSSIDs Critical Update Flag in Capability Information field is set to 1; The Beacon Parameters Change Count in RNR element related to AP1 is increased by 1; and All Updates Included in in RNR element related to AP1 is set to 0.

In various embodiments, AP mode switch can be acquired through one of: 1) a non-AP MLD sends ML Probe Request to AP MLD through AP2 to solicit the AP mode switch; 2) a non-AP MLD sends Probe Request to AP MLD through AP1 or transmitted BSSID AP that is in same multiple BSSID AP set as AP1 for AP mode switch; or 3) a non-AP MLD receives Beacon in AP1's link. In various implementations, different co-hosted APs can have different awake/doze states at any time. In various alternative embodiments, all co-hosted APs in the same device of the same multiple BSSID set can have the same awake/doze state (either all are in awake state, or all are in doze state).

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provide an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to."

As may even further be used herein, the term "configured to," "operable to," "coupled to," or "operably coupled to" indicates that an item includes one or more of power connections, input(s), output(s), etc., to perform, when activated, one or more its corresponding functions and may further include inferred coupling to one or more other items. As may still further be used herein, the term "associated with," includes direct and/or indirect coupling of separate items and/or one item being embedded within another item.

As may be used herein, the term "compares favorably," indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably," indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c," with more or less elements than "a," "b," and "c." In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b," "a" and "c," "b" and "c," and/or "a," "b," and "C."

As may also be used herein, the terms "processing module," "processing circuit," "processor," "processing circuitry," and/or "processing unit" may be a single processing device or a plurality of processing devices. Such a processing device may be a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules, and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in the form of a solid-state memory, a hard drive memory, cloud memory, thumb drive, server memory, computing device memory, and/or other physical medium for storing digital information.

As applicable, one or more functions associated with the methods and/or processes described herein can be implemented via a processing module that operates via the non-human "artificial" intelligence (AI) of a machine. Examples of such AI include machines that operate via anomaly detection techniques, decision trees, association rules, expert systems and other knowledge-based systems, computer vision models, artificial neural networks, convolutional neural networks, support vector machines (SVMs), Bayesian networks, genetic algorithms, feature learning, sparse dictionary learning, preference learning, deep learning and other machine learning techniques that are trained using training data via unsupervised, semi-supervised, supervised and/or reinforcement learning, and/or other AI. The human mind is not equipped to perform such AI techniques, not only due to the complexity of these techniques, but also due to the fact that artificial intelligence, by its very definition—requires "artificial" intelligence—i.e., machine/non-human intelligence.

As applicable, one or more functions associated with the methods and/or processes described herein can be implemented as a large-scale system that is operable to receive, transmit and/or process data on a large-scale. As used herein, a large-scale refers to a large number of data, such as one or more kilobytes, megabytes, gigabytes, terabytes or more of data that are received, transmitted and/or processed. Such receiving, transmitting and/or processing of data cannot practically be performed by the human mind on a large-scale within a reasonable period of time, such as within a second, a millisecond, microsecond, a real-time basis, or other high speed required by the machines that generate the data, receive the data, convey the data, store the data and/or use the data.

As applicable, one or more functions associated with the methods and/or processes described herein can require data to be manipulated in different ways within overlapping time spans. The human mind is not equipped to perform such different data manipulations independently, contemporaneously, in parallel, and/or on a coordinated basis within a reasonable period of time, such as within a second, a millisecond, microsecond, a real-time basis or other high speed required by the machines that generate the data, receive the data, convey the data, store the data and/or use the data.

As applicable, one or more functions associated with the methods and/or processes described herein can be implemented in a system that is operable to electronically receive digital data via a wired or wireless communication network and/or to electronically transmit digital data via a wired or wireless communication network. Such receiving and transmitting cannot practically be performed by the human mind because the human mind is not equipped to electronically transmit or receive digital data, let alone to transmit and receive digital data via a wired or wireless communication network.

As applicable, one or more functions associated with the methods and/or processes described herein can be implemented in a system that is operable to electronically store digital data in a memory device. Such storage cannot practically be performed by the human mind because the human mind is not equipped to electronically store digital data.

While particular combinations of various functions and features of one or more embodiments have been expressly described herein, other combinations of these features and functions are likewise possible. The present disclosure is not limited by the particular examples disclosed herein and expressly incorporates these other combinations.

What is claimed is:

1. A method of power management in a first wireless device associated with an additional wireless device, the method comprising:
receiving power management information for a first link of the first wireless device via any of a plurality of links of the first wireless device; and
managing power consumption of the first link of the first wireless device based on the power management information;
wherein managing the power consumption of the first link includes:
detecting a PPDU at the first wireless device;
determining that the PPDU is not addressed to the first wireless device;
in response to determining that the PPDU is not addressed to the first wireless device, transitioning the first wireless device to a first power-save state until an end of the PPDU, wherein during the first power-save state the first wireless device does not perform medium monitoring; and
subsequent to the end of the PPDU, transitioning the first wireless device to a second power-save state employing a single RF chain of a plurality of RF chains to perform medium monitoring.

2. The method of claim 1, further comprising:
in response to the first wireless device detecting a soliciting frame transmitted by the additional wireless device during the second power-save state:
transmitting a responding frame from the first wireless device to the additional wireless device;

exchanging frames between the first wireless device and the additional wireless device using the plurality of RF chains; and
transitioning to use of the single RF chain at a TXOP initiated by the soliciting frame.

3. The method of claim 1, further comprising:
announcing, by the first wireless device, a TWT mode indicating whether the additional wireless device is required to negotiate an individual TWT agreement with the first wireless device or join a broadcast TWT agreement broadcasted by the first wireless device.

4. The method of claim 1, wherein managing the power consumption of the first link includes:
switching to a doze state outside of both an individual target wake time service period (TWT SP) negotiated individually with the additional wireless device, and a broadcast TWT SP;
providing, to the additional wireless device, mode and state information allowing the additional wireless device to make frame transmission decisions, wherein providing the mode and state information includes:
announcing, to the additional wireless device, a power save mode used by the first wireless device; and
announcing, to the additional wireless device, a current active/doze state of the first wireless device.

5. The method of claim 4, further comprising:
during a period of time when the first wireless device is in the doze state, buffering frames to be transmitted to the first wireless device by the additional wireless device.

6. The method of claim 1, wherein the first wireless device is a first multi-link wireless device (MLD) including a plurality of APs, and the additional wireless device is a second MLD, and wherein managing the power consumption of the first link of the first wireless device includes:
announcing power save modes and current active/doze states of the plurality of APs to the second MLD via a plurality of different links of the first MLD; and
receiving, at the first MLD, a request from the second MLD for the first link to switch to an awake state to receive buffered frames, wherein the request is received during a time the first MLD is operating in one of the power save modes.

7. The method of claim 6, wherein:
the request for the first link of the first MLD to switch to an awake state is received at the first MLD through a second link, different than the first link.

8. The method of claim 7, further comprising:
selecting, by the first MLD, one link to remain in an awake state to receive wake requests for other links of the plurality of different links of the first MLD.

9. The method of claim 6, further comprising:
receiving the request for the first link of the first MLD to switch to an awake state at the first MLD through the first link.

10. A method of power management in a first wireless device and associated with an additional wireless device, the method comprising:
receiving, in one or more frames, power management information for a first link of the first wireless device via any of a plurality of links of the first wireless device; and
managing changes in a power save state of the first link of the first wireless device based on the power management information;

wherein the first wireless device is a first multi-link wireless device (MLD) including a plurality of APs, and the additional wireless device is a second MLD, and wherein managing changes in the power save state of the first link of the first wireless device includes:

announcing power save modes and current active/doze states of the plurality of APs to the second MLD via a plurality of different links of the first MLD; and receiving, at the first MLD, a request from the second MLD for the first link to switch to an awake state to receive buffered frames, wherein the request is received during a time the first MLD is operating in one of the power save modes.

11. The method of claim 10, wherein managing changes in the power save state of the first link includes:

detecting a PPDU at the first wireless device;

determining that the PPDU is not addressed to the first wireless device;

in response to determining that the PPDU is not addressed to the first wireless device, transitioning the first wireless device to a first power-save state until an end of the PPDU, wherein during the first power-save state the first wireless device does not perform medium monitoring;

subsequent to the end of the PPDU, transitioning the first wireless device to a second power-save state employing a single RF chain of a plurality of RF chains to perform medium monitoring;

detecting, by the first wireless device, a soliciting frame transmitted by the additional wireless device during the second power-save state;

in response to the first wireless device detecting a soliciting frame transmitted by the additional wireless device during the second power-save state:

transmitting a responding frame from the first wireless device to the additional wireless device;

exchanging frames between the first wireless device and the additional wireless device using the plurality of RF chains; and transitioning to use of the single RF chain at a TXOP initiated by the soliciting frame.

12. The method of claim 11 further comprising:

announcing, by the first wireless device, a TWT mode indicating whether the additional wireless device is required to negotiate an individual TWT agreement with the first wireless device or join a broadcast TWT agreement broadcasted by the first wireless device.

13. The method of claim 10, wherein managing changes in the power save state of the first link includes:

switching to a doze state outside of both an individual target wake time service period (TWT SP) negotiated individually with the additional wireless device, and a broadcast TWT SP;

providing, to the additional wireless device, mode and state information allowing the additional wireless device to make frame transmission decisions, wherein providing the mode and state information includes:

announcing, to the additional wireless device, a power save mode used by the first wireless device; and announcing, to the additional wireless device, a current active/doze state of the first wireless device.

14. The method of claim 13, further comprising:

during a period of time when the first wireless device is in the doze state, buffering frames to be transmitted to the first wireless device by the additional wireless device.

15. The method of claim 10, wherein:

the request for the first link of the first MLD to switch to an awake state is received at the first MLD via one of a second link, different than the first link; or at the first MLD via the first link.

16. The method of claim 15, further comprising:

selecting, by the first MLD, one link to remain in an awake state to receive wake requests for other links of the plurality of different links of the first MLD.

17. A wireless device, comprising:

a radio frequency (RF) transceiver configured to implement a plurality of links;

the RF transceiver further configured to receive power management information for a first link of the plurality of links via any of the plurality of links; and a processor configured to manage power save states of the first link based on the power management information;

wherein the wireless device is a first multi-link wireless device (MLD) including a plurality of APs and is associated with a second MLD, and wherein:

the processor is further configured to manage changes in a power save state of the first link by announcing power save modes and current active/doze states of the plurality of APs to the second MLD via a plurality of different links of the first MLD; and the first MLD is configured to receive a request from the second MLD for the first link to switch to an awake state to receive buffered frames, wherein the request is received during a time the first MLD is operating in one of the power save modes.

18. The wireless device of claim 17, wherein the processor is further configured to:

detect a PPDU received via a particular link of the plurality of links;

determine that the PPDU is not addressed to the wireless device;

in response to determining that the PPDU is not addressed to the wireless device, transitioning the wireless device to a first power-save state until an end of the PPDU, wherein during the first power-save state the wireless device does not perform medium monitoring;

subsequent to the end of the PPDU, transitioning the wireless device to a second power-save state employing a single RF chain of a plurality of RF chains to perform medium monitoring;

detect, during the second power-save state, a soliciting frame transmitted by an additional wireless device associated with the wireless device;

in response to detecting the soliciting frame:

transmitting a responding frame from the wireless device to the additional wireless device;

exchanging frames between the wireless device and the additional wireless device using the plurality of RF chains; and transitioning to use of the single RF chain at a TXOP initiated by the soliciting frame.

19. The wireless device of claim 18, wherein the processor is further configured to:

announce a TWT mode indicating whether the additional wireless device is required to negotiate an individual TWT agreement with the wireless device or join a broadcast TWT agreement broadcasted by the wireless device.

20. The wireless device of claim 17, wherein the processor is further configured to:

switch the wireless device to a doze state outside of both an individual target wake time service period (TWT SP) negotiated individually with an additional wireless device associated with the wireless device, and a broadcast TWT SP;

provide, to the additional wireless device, mode and state information allowing the additional wireless device to make frame transmission decisions, wherein providing the mode and state information includes:

announcing, to the additional wireless device, a power save mode used by the wireless device; and announcing, to the additional wireless device, a current active/doze state of the wireless device.

21. The wireless device of claim 17, wherein:

the request for the first link of the first MLD to switch to an awake state is received at the first MLD via one of a second link, different than the first link; or at the first MLD via the first link.

22. The wireless device of claim 21, wherein the processor is further configured to:

select one link to remain in an awake state to receive wake requests for other links of the plurality of different links of the first MLD.

\* \* \* \* \*